United States Patent [19]
Eldredge et al.

[11] 3,931,144
[45] Jan. 6, 1976

[54] MAGENTA IMAGE-PROVIDING PHENYLAZONAPHTHYL DYES

[75] Inventors: Carl H. Eldredge; Jan R. Haase; Richard A. Landholm, all of Rochester, N.Y.

[73] Assignee: Eastman Kodak Company, Rochester, N.Y.

[22] Filed: Feb. 5, 1974

[21] Appl. No.: 439,816

Related U.S. Application Data

[63] Continuation-in-part of Ser. No. 331,728, Feb. 12, 1973, abandoned.

[52] U.S. Cl. .................... 260/197; 96/1.2; 96/1.3; 96/1.6; 96/3; 96/29 R; 96/55; 96/66; 260/198; 260/199; 260/200; 260/201; 260/202
[51] Int. Cl.² .................... C09B 29/10; C09B 29/20; G03C 5/30; G03C 5/54
[58] Field of Search ........... 260/197, 198, 199, 200, 260/201, 202; 96/3

[56] References Cited
UNITED STATES PATENTS

| | | | |
|---|---|---|---|
| 2,706,684 | 4/1955 | Graham et al. .................. | 260/202 X |
| 3,148,062 | 9/1964 | Whitmore et al. ................ | 96/55 |
| 3,443,939 | 5/1969 | Bloom et al. .................... | 96/3 |
| 3,443,940 | 5/1969 | Bloom et al. .................... | 96/3 |
| 3,459,548 | 8/1969 | Bloom et al. .................... | 96/3 |
| 3,498,785 | 3/1970 | Bloom et al. .................... | 96/3 |
| 3,585,028 | 6/1971 | Stephens ........................ | 96/3 |
| 3,628,952 | 12/1971 | Puschel et al. .................. | 96/3 |
| 3,709,693 | 1/1973 | Bloom et al. .................... | 96/118 |
| 3,737,316 | 6/1973 | Solminem et al. ................. | 96/56.6 |
| 3,751,406 | 8/1973 | Bloom ........................... | 260/162 |

*Primary Examiner*—Floyd D. Higel
*Assistant Examiner*—John J. Doll
*Attorney, Agent, or Firm*—Elliott Stern; Daniel B. Reece, III

[57] ABSTRACT

A nondiffusible sulfonamide compound which is alkali-cleavable upon oxidation to release a diffusible magenta color-providing moiety from a benzene nucleus thereof, said compound having a formula as follows:

I.

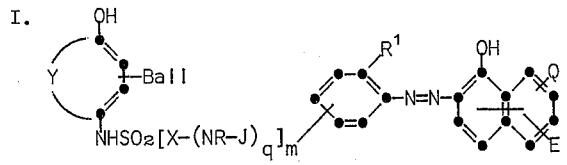

II.

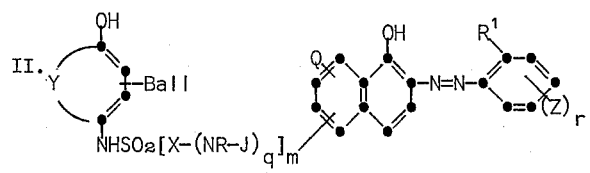

III.

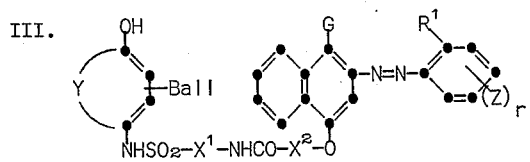

wherein
Ball represents an organic ballasting group.
Y represents the carbon atoms necessary to complete a benzene or naphthalene nucleus;
X represents a bivalent linking group;
R represents hydrogen or alkyl;
J represents sulfonyl or carbonyl;
m and q each represent an integer having a value of 0 or 1;
$R^1$ represents hydrogen, halogen, alkyl or alkoxy;
Q is in the 5- or 8-position relative to the hydroxy radical and represents hydrogen, hydroxy or an acylamino radical;
G represents hydroxy, a salt thereof, or a hydrolyzable acyloxy group;
E represents hydrogen, sulfo, a sulfamoyl radical; or E can represent a radical of the formula

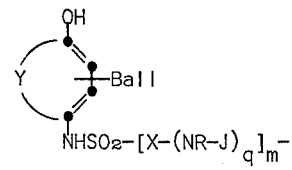

wherein
each member is as described previously;
r is an integer having a value of 1 or 2;
Z represents halogen, carboxy; a carboxylic acid ester; a sulfamoyl radical; as well as hydrogen, alkoxy, an alkyl radical, or a carbamoyl radical;
$X^1$ represents an alkylene, phenylene radical or substituted phenylene as described for $R^2$;
$X^2$ represents an alkylene radical as described for $R^2$;
with the proviso that there be only one sulfo or carboxy radical present in said compound and that only one of $R^1$ and Z be hydrogen.

10 Claims, No Drawings

MAGENTA IMAGE-PROVIDING PHENYLAZONAPHTHYL DYES

This is a continuation-in-part of application U.S. Ser. No. 331,728 filed Feb. 12, 1973, now abandoned.

This invention relates to the art of photography and more particularly to color diffusion transfer photography employing magenta dye-releasing sulfonamidophenol compounds.

Color diffusion transfer processes such as described in U.S. Pat. No. 2,983,606 generally involve the use of a photographic element comprising a support, at least one silver halide emulsion layer and a dye developer which is contained in or contiguous said layer. A liquid processing composition is applied to the element and permeates the emulsion to provide a solution of the dye developer substantially uniformly distributed in the emulsion. As the exposed silver halide emulsion is developed, the oxidation product of the dye developer is immobilized or precipitated in situ with the developed silver, thereby providing an imagewise distribution of unoxidized dye developer dissolved in the liquid processing composition. This immobilization is apparently due, at least in part, to a change in the solubility characteristics of the dye developer upon oxidation. At least part of this imagewise distribution of unoxidized dye-developer is transferred to a superimposed image-receiving layer to provide a transfer image.

In these prior art systems, the developer moiety of the dye developer is transferred with the dye to the image-receiving layer. It is desirable, however, to provide a transfer system in which only the necessary chemical entity, i.e., the dye, is transferred to the receiver.

In U.S. Pat. Nos. 3,443,939, 3,443,940 and 3,443,941, "splittable" ring-closing compounds such as dye developers are described wherein a diffusible dye moiety is split off the compound and transferred to provide the desired image while the remainder of the compound undergoes an internal cyclization or ring-closing reaction, usually as a result of reaction with an oxidized aromatic primary amino color-developing agent. In U.S. Pat. Nos. 3,227,550, 3,227,551 and 3,227,552, nondiffusible couplers are described in certain embodiments which release preformed dyes as a result of a coupling reaction with oxidized color-developing agent. Canadian Pat. No. 602,607 discloses p-phenylenediamine compounds which contain a dye moiety. These compounds can be oxidized to the quinonediamine, and by subsequent treatment with strong alkali deamination takes place releasing a diffusible dye for transfer to a reception layer. However, compounds are desired which provide improved dye-release mechanisms in photographic systems and which do not require the use of a colordeveloping agent.

Fleckenstein et al, allowed U.S. Ser. No. 351,673, a continuation-in-part of application Ser. No. 282,796, filed Aug. 22, 1972, and now abandoned, and entitled PHOTOGRAPHIC SYSTEMS, describes improved dye-release mechanisms for photographic imaging which do not require the use of a color-developing agent and which offer other advantages. Certain of the mechanisms of Fleckenstein et al utilize nondiffusible p-sulfonamidophenol dye-releasing compounds which are alkali-cleavable upon oxidation to thereby release a diffusible dye. It is desirable to provide additional compounds which are highly immobile and which exhibit improved hue and diffusibility of the dyes released therefrom.

We have found a class of magenta azo dye-releasing sulfonamidophenol compounds well-suited for use in color diffusion transfer photographic elements. These dye-releasing compounds are immobile and the resultant released dyes have good hue and diffusibility properties.

The objects of the present invention are achieved through the use of a new class of sulfonamidophenol compounds which, when oxidized, are capable of releasing a novel magenta azo dye of this invention. These dye-releasing redox (DRR) compounds, according to our invention, are utilized in a photosensitive element which comprises a support having thereon at least one photosensitive silver halide emulsion layer, and at least one of said layers having associated therewith a nondiffusible p-sulfonamidophenol compound of the invention having a color-providing moiety attached through the sulfonamido group.

The sulfonamidophenol compounds of this invention can be represented by the following formulas:

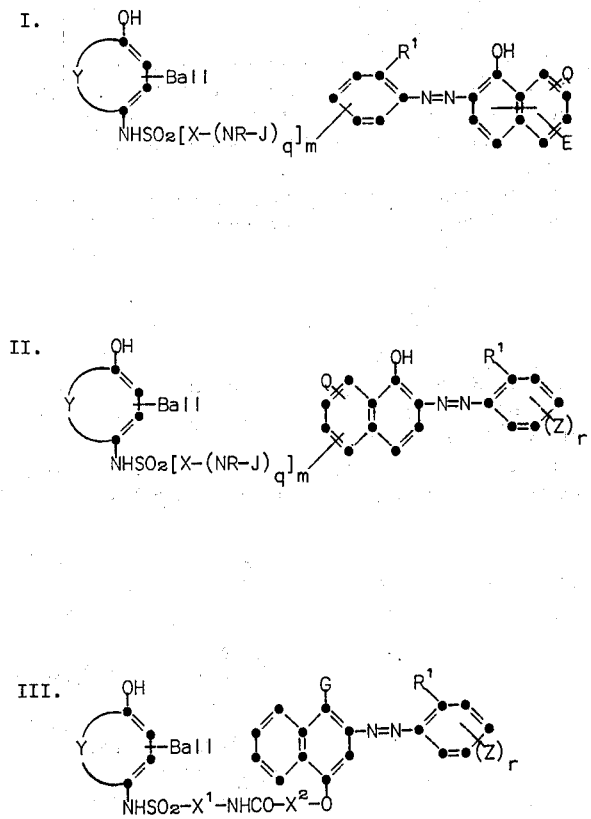

wherein Ball represents an organic ballasting group of such size and configuration as to render the compound nondiffusible during development in an alkaline processing composition;

Y represents the carbon atoms necessary to complete a benzene or naphthalene nucleus;

X represents a bivalent linking group of the formula $-R^2-L_n-R^2{}_p-$ where each $R^2$ can be the same or different and each represents an alkylene radical having 1 to about 8 carbon atoms; a phenylene radical; or a substituted phenylene radical having 6 to about 9 carbon atoms; L represents a bivalent radical selected from oxy, carbonyl, carboxamido, carbamoyl, sulfonamido, sulfamoyl, sulfinyl or sulfonyl; $n$ is an integer having a value of 0 or 1; $p$ is 1 when $n$ equals 1 and $p$ is 1 or 0 when $n$ equals 0, provided that when $p$ is 1 the carbon content of the sum of both $R^2$ radicals does not exceed 14 carbon atoms;

R represents a hydrogen atom, or an alkyl radical having 1 to about 6 carbon atoms;

J represents a bivalent radical selected from sulfonyl or carbonyl;

$m$ and $q$ each represent an integer having a value of 0 or 1;

$R^1$ represents a hydrogen atom, a halogen atom, an alkyl radical having 1 to about 6 carbon atoms or an alkoxy radical having 1 to about 6 carbon atoms;

Q is in the 5- or 8-position relative to the hydroxy radical and represents a hydrogen atom, a hydroxy radical or a radical having the formula —NHCOR$^3$ or —NHSO$_2$R$^3$ wherein R$^3$ is an alkyl radical having 1 to about 6 carbon atoms, a substituted alkyl radical having 1 to about 6 carbon atoms, benzyl, phenyl, or a substituted phenyl radical having 6 to about 9 carbon atoms;

G represents a hydroxy radical, a salt thereof, or a hydrolyzable acyloxy group having the formula:

wherein R$^4$ is an alkyl radical having 1 to about 18 carbon atoms, phenyl or substituted phenyl having 6 to about 18 carbon atoms;

E represents a hydrogen atom, a sulfo radical, a sulfamoyl radical having the formula —SO$_2$NR$^5$R$^6$ wherein R$^5$ represents hydrogen or an alkyl group having 1 to about 6 carbon atoms and R$^6$ represents hydrogen, an alkyl radical having 1 to about 6 carbon atoms, a substituted alkyl radical having 1 to about 6 carbon atoms, a benzyl radical, a phenyl radical, or a substituted phenyl radical having 6 to about 9 carbon atoms, as described previously; or E can represent a radical of the formula

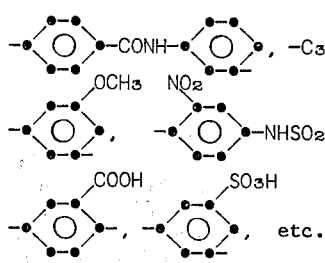

wherein each member is as described previously;

$r$ is an integer having a value of 1 or 2;

Z represents a halogen atom; a carboxy radical, a carboxylic acid ester having the formula —COOR$^4$ wherein R$^4$ is as described previously, a sulfo radical, a sulfamoyl radical as described for E, as well as a hydrogen atom, an alkoxy radical having 1 to about 6 carbon atoms, an alkyl radical having 1 to about 6 carbon atoms, a substituted alkyl radical having 1 to about 6 carbon atoms, or a carbamoyl radical having the formula —CON(R$^5$)$_2$ wherein each R$^5$ is the same or different and is as described previously;

X$^1$ represents an alkylene, phenylene radical or substituted phenylene as described for R$^2$;

X$^2$ represents an alkylene radical as described for R$^2$;

with the proviso that there be only one sulfo or carboxy radical present in said compound and that only one of R$^1$ and Z be hydrogen.

Examples of bivalent alkylene linking groups representative of R$^2$ are —CH$_2$—, —C$_2$H$_4$—, —C$_6$H$_{12}$—, —C$_3$H$_6$—, —C$_4$H$_8$—, etc., as well as branched alkylene radicals such as

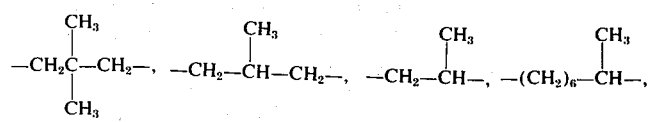

etc.

References hereinafter to $o$, $m$ and $p$ mean that either the ortho, meta or para radicals are indicated, as the case may be.

Examples of phenylene and substituted phenylene radicals representative of R$^2$ are $o,m,p$-phenylene, $o,m,p$-phenylene substituted with chloro, methoxy, butoxy, bromo, cyano, nitro, methyl, ethyl, carboxy, sulfo, amino, etc.

As used herein the oxygen- or sulfur-containing bivalent radicals representative of L are oxy (—O—), carbonyl (—CO—), carboxamide (-CONH-), carbamoyl (-NHCO-), sulfonamido (—SO$_2$NH—), sulfamoyl (—NHSO$_2$—), sulfinyl (—SO—) and sulfonyl (—SO$_2$—). Therefore, non-limiting examples of bivalent linking groups which may be represented by X are —CH$_2$—O—CH$_2$—,

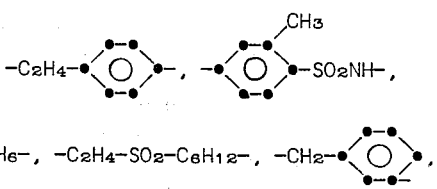

Examples of the groups which R may represent are hydrogen, methyl, ethyl, isopropyl, pentyl, hexyl, etc. The alkyl group represented by R may additionally be substituted with cyano, hydroxy, methoxy, etc.

Examples of groups representative of Q are a hydrogen atom, a hydroxy radical or a radical having the formula —NHCOR$^3$ or —NHSO$_2$R$^3$ wherein R$^3$ is as described previously such as —NHCOCH$_3$, —NHCOC$_2$H$_5$, —NHCOC$_6$H$_{13}$, —NHCOC$_2$H$_4$CN, —NHCOC$_3$H$_6$SO$_2$NH$_2$, —NHCOCH$_2$C$_6$H$_5$, —NHCOC$_6$H$_4$COOH, —NHSO$_2$CH$_3$, —NHSO$_2$C$_6$H$_4$CN, —NHSO$_2$C$_6$H$_4$Cl, —NHSO$_2$C$_2$H$_5$, —NHCOC$_3$H$_6$SO$_3$H, —NHSO$_2$C$_6$H$_4$OCH$_3$, etc.

Examples of the groups which G may represent are hydroxy, salts thereof such as alkali metal (e.g., -O$^-$Li$^+$, -O$^-$K$^+$, -O$^-$Na$^+$) salts and photographically inactive ammonium salts thereof such as -O$^{-+}$NH$_4$,

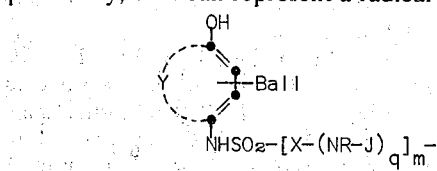

$-O^{-+}NH(CH_3)_3$, $-O^{-+}N(C_2H_5)_4$,

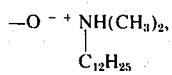

$-O^{-+}NH(C_{12}H_{25})_3$, $-O^{-+}NH(C_2H_5)_3$,

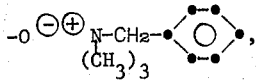

i.e., a trialkyl or tetralkyl ammonium salt (sometimes called "amine salts") which does not adversely affect the photographic utility of the magenta image dye-providing compound or the physical or chemical processes which occur during development of the image.

G may also advantageously represent a hydrolyzable acyloxy group having the formula

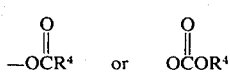

wherein $R^4$ is as described previously. Non-limiting examples of these hydrolyzable groups are

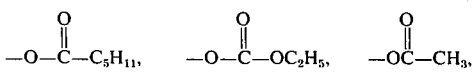

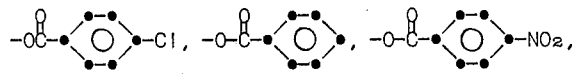

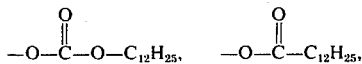

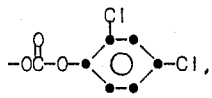

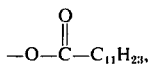

etc.

Examples of substituents which E may represent are chloro, bromo, fluoro, a sulfo radical including salts thereof, such as alkali metal or photographically inactive ammonium salts (e.g., $-SO_3H$, $-SO_3^-Li^+$, $SO_3^-K^+$, $-SO_3^-Na^+$, $-SO_3^-NH_4^+$, etc.); $-SO_2NH_2$, $-SO_2NHCH_3$, $-SO_2NHC_2H_5$, $-SO_2N(CH_3)_2$, $-SO_2NHCH_2C_6H_5$,

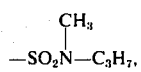

$-SO_2NHC_2H_4SO_2NH_2$, $-SO_2NHCH_2C_6H_5$, $-SO_2NHC_2H_5SO_3H$,

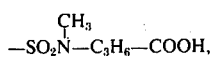

etc.

Examples of substituents which Z may represent are chloro, bromo, fluoro, a carboxylic acid ester such as $-COOCH_3$, $-COOC_{11}H_{23}$, $-COOC_2H_5$, $-COOC_6H_5$,

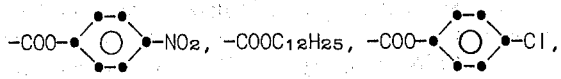

etc.; a carboxy radical including salts thereof, such as alkali metal salts or photographically inactive ammonium salts (e.g., -COOH, $-COO^-Li^+$, $-COO^-K^+$, $-COO^-Na^+$, $-COO^-NH_4^+$, etc.); a sulfo radical and a sulfamoyl radical as described for E above; hydrogen, methoxy, isopropoxy, ethoxy, butoxy, pentoxy, etc., methyl ethyl, butyl, hexyl, isobutyl, propyl, $-C_2H_4CN$, $-C_3H_6OH$, $-C_2H_4OCH_3$, $-C_3H_6CN$, etc., $-CONH_2$, $-CON(C_2H_5)_2$,

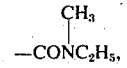

$-CONHCH_3$, $-CONHC_6H_5$, etc.

Examples of the bivalent radicals which $X^1$ may represent are those mentioned for $R^2$ above.

Examples of the radicals which $X^2$ may represent are $-C_2H_4-$,

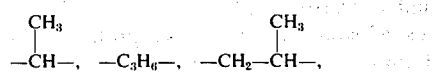

Preferred compounds include those having the formulas above wherein

Y represents the atoms necessary to complete a naphthalene nucleus;

$R^2$ represents an alkylene radical having 1 to about 4 carbon atoms, phenylene or phenylene substituted with carboxy, chloro, methyl or methoxy;

L represents sulfamoyl, sulfonamido, carbamoyl or carboxamido;

R represents hydrogen;

n is 0, p is 0;

q is an integer having a value of 1;

m is an integer having a value of 0 or 1;

$R^1$ represents an alkoxy radical having 1 to about 4 carbon atoms;

Q represents hydrogen, hydroxy, $-NHCOR^3$ or $-NHSO_2R^3$ wherein $R^3$ represents an alkyl radical having 1 to about 4 carbon atoms; an alkyl radical having 1 to about 4 carbon atoms substituted with hydroxy cyano, sulfamoyl, carboxy or sulfo; benzyl, phenyl or phenyl substituted with carboxy, chloro, methyl, methoxy or sulfamoyl;

E represents a sulfo radical, a sulfamoyl radical having the formula $-SO_2NHR^6$ wherein $R^6$ is hydrogen, an alkyl radical having 1 to about 4 carbon atoms, or an alkyl radical having 1 to about 4 carbon atoms substituted with hydroxy, cyano, sulfamoyl, carboxy or sulfo; benzyl, phenyl, or phenyl substituted with hydroxy, sulfonyl, sulfamoyl, carboxy or sulfo;

r has a value of 1; and

Z represents hydrogen, an alkyl radical having 1 to about 4 carbon atoms; chloro; an alkyl radical having 1 to about 6 carbon atoms substituted with hydroxy, cyano, sulfamoyl, carboxy, sulfo, or an alkyl sulfonamido radical having 1 to about 4 carbon atoms;

$X^1$ represents phenylene; and $X^2$ represents an alkylene radical having 1 to about 4 carbon atoms.

Especially preferred compounds are those wherein X represents phenylene; J represents sulfonyl; $X^1$ represents phenylene; $X^2$ represents an alkylene radical of 1 to about 4 carbon atoms; Q represents hydrogen, hydroxy, $-NHSO_2CH_3$, or $-NHCOCH_3$; and Z represents hydrogen, chloro, or $-CH_2NHSO_2CH_3$.

As indicated above preferred compounds are those having Formulas I, II and III above wherein the radical of the formula IV. 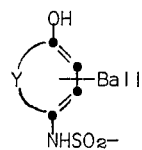

contains an organic ballasting group (Ball) of such size and configuration as to render the compound nondiffusible during development in the alkaline processing composition and Y represents the carbon atoms necessary to complete a benzene or naphthalene nucleus including substituted benzene or naphthalene. When Y represents the atom necessary to complete a naphthalene nucleus, Ball can be attached to either ring thereof. Preferred ballasting groups are those wherein -Ball represents -CNH-Ball or $-SO_2NH$-Ball. Examples of some of the above preferred radicals are as follows:

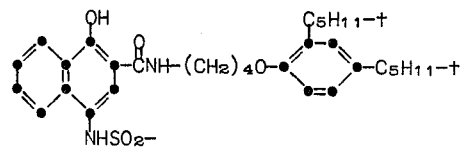

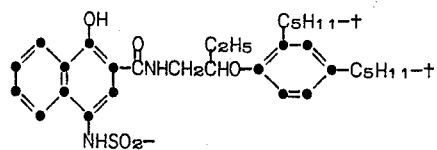

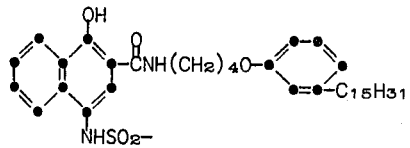

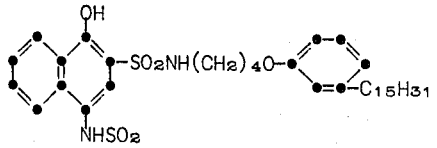

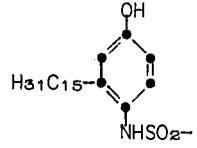

-continued

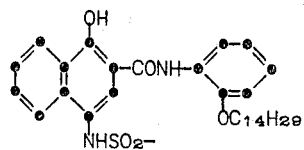

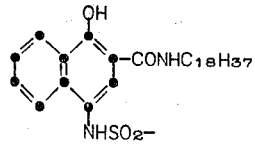

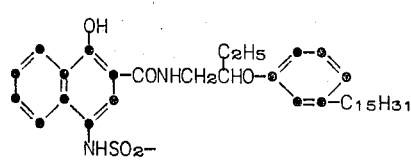

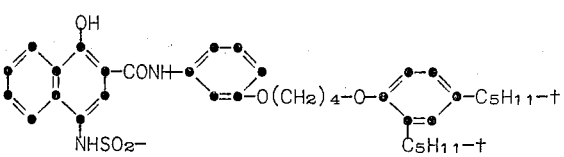

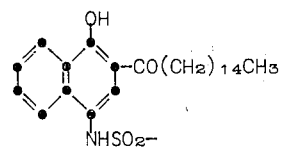

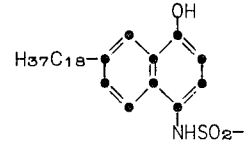

The nature of the ballast group (Ball) in the Formula IV for the compounds described above is not critical as long as it confers nondiffusibility to the compounds. Typical ballast groups include long straight or branched chain alkyl radicals linked directly or indirectly to the compound as well as aromatic radicals of the benzene and naphthalene series indirectly attached or fused directly to the benzene nucleus, etc. Useful ballast groups generally have at least 8 carbon atoms such as a substituted or unsubstituted alkyl group of 8 to 22 carbon atoms, an amide radical having 8 to 30 carbon atoms, a keto radical having 8 to 30 carbon atoms, etc., and may even comprise a polymer backbone. Especially preferred compounds are those wherein the ballast is attached to the benzene nucleus through a carbamoyl radical (—NHCO—) or a sulfamoyl radical (—$SO_2NH$—) in which the nitrogen is adjacent the ballast group.

In addition to the ballast, the benzene nucleus in the above formula may have groups or atoms attached thereto such as the halogens, alkyl, aryl, alkoxy, aryloxy, nitro, amino, alkylamino, arylamino, amido, cyano, alkylmercapto, keto, carboalkoxy, heterocyclic groups, etc.

The preferred novel magenta dyes which are released from the novel dye-releasing redox (DRR) compounds as a function of oxidation under alkaline conditions may be represented by the following formulas:

V.

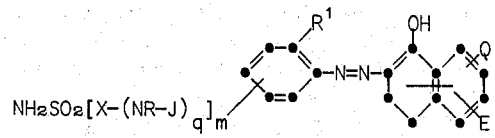

VI.

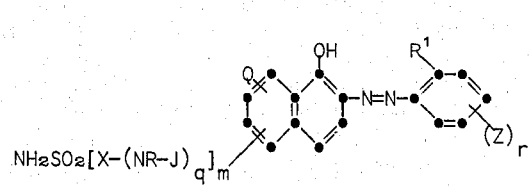

VII.

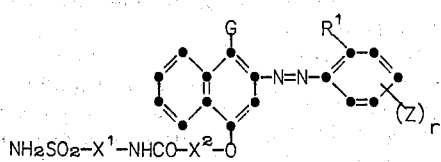

wherein
$X^1$, $X^2$, R, $R^1$, J, q, m, Q, G, Z, r and E are as described previously, except that the radical corresponding to Formula IV above and described for E is replaced by the radical $NH_2SO_2[X-(NH-J)_q]_m-$. The preferred released dyes, of course, correspond to the above mentioned preferred image dye-providing (DRR) compounds set forth above. These dyes may be released by the reaction described in Fleckenstein et al, allowed U.S. Ser. No. 351,673, a continuation-in-part of U.S. Ser. No. 282,796.

A suitable process for producing a photographic transfer image in color using the compounds of our invention comprises the steps of:

1. treating the above-described photosensitive element with an alkaline processing composition in the presence of a silver halide developing agent to effect development of each of the exposed silver halide emulsion layers, thereby oxidizing the developing agent and the oxidized developing agent in turn cross-oxidizing the sulfonamido compound;
2. forming an imagewise distribution of diffusible released dye as a function of the imagewise exposure of each of the silver halide emulsion layers by cleaving each cross-oxidized sulfonamido compound; and
3. diffusing to a dye image-receiving layer at least a portion of each of the imagewise distributions of diffusible released dye to provide an image.

The photosensitive element in the above-described process can be treated with an alkaline processing composition to effect or initiate development in any manner. A preferred method for applying processing composition is by use of a rupturable container or pod which contains the composition. In general, the processing composition employed in our system contains the developing agent for development, although the composition could also just be an alkaline solution where the developer is incorporated in the photosensitive element, in which case the alkaline solution serves to activate the incorporated developer.

A photographic film unit according to our invention which is adapted to be processed by passing the unit between a pair of juxtaposed pressure-applying members, comprises:

1. a photosensitive element as described above;
2. a dye image-receiving layer; and
3. means for discharging an alkaline processing composition within the film unit such as a rupturable container which is adapted to be positioned during processing of the film unit so that a compressive force applied to the container by the pressure-applying members will effect a discharge of the contents of the container within the film unit;

the film unit containing a silver halide developing agent.

The dye image-receiving layer in the above-described film unit can be located on a separate support adapted to be superposed on the photosensitive element after exposure thereof. Such image-receiving elements are generally disclosed, for example, in U.S. Pat. No. 3,362,819. When the means for discharging the processing composition is a rupturable container, typically it is positioned in relation to the photosensitive element and the image-receiving element so that a compressive force applied to the container by pressure-applying members, such as found in a camera designed for in-camera processing, will effect a discharge of the contents of the container between the image-receiving element and the outermost layer of the photosensitve element. After processing, the dye image-receiving element is separated from the photosensitive element.

The dye image-receiving layer in the above-described film unit can also be located integral with the photosensitive silver halide emulsion layer. One useful format for integral receiver-negative photosensitive elements is disclosed in Belgian Pat. No. 757,960. In such an embodiment, the support for the photosensitive element is transparent and is coated with an image-receiving layer, a substantially opaque light reflective layer, e.g., $TiO_2$, and then the photosensitive layer of layers described above. After exposure of the photosensitive element, a rupturable container containing an alkaline processing composition and an opaque process sheet are brought into superimposed position. Pressure-applying members in the camera rupture the container and spread processing composition over the photosensitive element as the film unit is withdrawn from the camera. The processing composition develops each exposed silver halide emulsion layer and dye images are formed as a function of development which diffuse to the image-receiving layer to provide a position, right-reading image which is viewed through the transparent support on the opaque reflecting layer background.

Another format for integral negative-receiver photosensitive elements in which the present invention can be employed is disclosed in Belgian Pat. No. 757,959. In this embodiment, the support for the photo-sensitive element is transparent and is coated with the image-receiving layer, a substantially opaque, light-reflective layer and the photosensitive layer or layers described above. A rupturable container containing an alkaline processing composition and an opacifier is positioned adjacent to the top layer and a transparent top sheet. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light insensitive. The processing composition develops each silver halide layer and dye images are formed as a result of development which diffuse to the image-receiving layer to provide a right-reading image that is viewed through the transparent support on the opaque reflecting layer background.

Still other useful integral formats in which our sulfonamido compounds can be employed are described in U.S. Pat. Nos. 3,415,644; 3,415,645; 3,415,646; 3,647,437; and 3,635,707.

The film unit or assembly of the present invention can be used to produce positive images in single or multicolors. In a three-color system, each silver halide emulsion layer of the film assembly will have associated therewith an image dye-providing material possessing a predominant spectral absorption within the region of the visible spectrum to which said silver halide emulsion is sensitive, i.e., the blue-sensitive silver halide emulsion layer will have a yellow image dye-providing material associated therewith, the green-sensitive silver halide emulsion layer will have a magenta image dye-providing material associated therewith, and the red-sensitive silver halide emulsion layer will have a cyan image dye-providing material associated therewith. The image dye-providing material associated with each silver halide emulsion layer can be contained either in the silver halide emulsion layer itself or in a layer contiguous to the silver halide emulsion layer. The magenta image dye-providing material will, of course, be a compound of this invention.

When G is a hydrolyzable acyloxy group, the absorption spectrum of the azo dye is shifted to shorter wavelength. "Shifted dyes" of this type absorb light outside the range to which the associated silver halide layer is sensitive. The use of certain related shifted azo dye developers is described in U.S. Pat. No. 3,307,947 issued Mar. 7, 1967. The shifted dye-providing materials of this invention can be advantageously contained in the silver halide emulsion layer without substantially reducing the sensitivity of the layer. The acyloxy group is hydrolyzed by the alkaline processing composition, releasing the magenta dye of the desired hue. The yellow and cyan image dye-providing materials can be selected from a variety of materials such as those compounds described by Fleckenstein et al allowed U.S. Ser. No. 351,673, a continuation-in-part of U.S. Ser. No. 282,796, mentioned previously. Additional useful cyan image dye-providing materials are described in co-filed Haase et al U.S. Ser. No. 439,789, a continuation-in-part of application Ser. No. 331,727, and now abandoned, entitled Photographic Materials and Compounds Useful Therein.

The concentration of the compounds, which preferably are alkali-cleavable upon oxidation, that are employed in the present invention can be varied over a wide range depending upon the particular compound employed and the results which are desired. For example, the image dye-providing compounds of the present invention can be coated in layers as dispersions in a hydrophilic film-forming natural or synthetic polymer, such as gelatin, polyvinyl alcohol, etc., which is adapted to be permeated by aqueous alkaline processing composition. Preferably, the ratio of dye-providing compound to polymer will be about 0.25 to about 4.0. The present compounds may then be incorporated in a gelatin by techniques known in the art (e.g., a high boiling, water immiscible organic solvent or a low boiling or water miscible organic solvent).

A variety of silver halide developing agents can be employed in our invention. Any silver halide developing agent can be used as long as it cross-oxidizes with the image dye-providing compounds used herein. The developer can be employed in the photosensitive element to be activated by the alkaline processing composition. Specific examples of developers which can be employed in our invention include hydroquinone, aminophenols, e.g., N-methyl-aminophenol, Phenidone (1-phenyl-3-pyrazolidone) trademark of Ilford, Ltd.; Dimezone (1-phenyl-4,4-dimethyl-3-pyrazolidone) trademark of Eastman Kodak Company; 1-phenyl-4-methyl-4-hydroxymethyl-3-pyrazolidone, N,N-diethyl-p-phenylenediamine, 3-methyl-N,N-diethyl-p-phenylenediamine, 3-methoxy-N,N-diethyl-p-phenylenediamine, etc. The black-and-white developers in this list are preferred, in that they have a reduced propensity of staining the dye image-receiving layer.

In a preferred embodiment of our invention, the silver halide developer in our process becomes oxidized upon development and reduces silver halide to silver metal. The oxidized developer then cross-oxidizes the sulfonamido-phenol or sulfonamido-naphthol dye-releasing compound. The product of cross-oxidation then undergoes alkaline hydrolysis, thus releasing an imagewise distribution of diffusible anionic dye which then diffuses to the receiving layer to provide the dye image. The diffusible moiety is transferable in alkaline processing composition either by virtue of its self-diffusivity or by having attached to it one or more solubilizing groups such as $-COOH$, $-SO_3H$, $-SO_2NR^5R^6$, $OH$, etc. (where $R^5$ and $R^6$ are as described previously with at least one being hydrogen).

In using the especially preferred dye-releasing compounds according to our invention, the production of diffusible dye images is a function of development of the silver halide emulsions with a silver halide developing agent to form either negative or direct positive silver images in the emulsion layers. If the silver halide emulsion employed forms a direct positive silver image, such as a direct positive internal-image emulsion or a solarzing emulsion, which develops in unexposed areas, a positive image can be obtained on the dye image-receiving layer. After exposure of the film unit, the alkaline processing composition permeates the various layers to initiate development in the unexposed photosensitive silver halide emulsion layers. The developing agent present in the film unit develops each of the silver halide emulsion layers in the unexposed areas (since the silver halide emulsions are direct-positive ones), thus causing the developing agent to becomes oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction in a preferred embodiment of our invention, to release the preformed dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit lowers the pH of the film unit (or the image-receiving unit) to stabilize the image.

Internal-image silver halide emulsions useful in those embodiments wherein a dye is released as a function of oxidation are direct-positive emulsions that form latent images predominantly inside the silver halide grains, as distinguished from silver halide grains that form latent images predominantly on the surface thereof. Such internal-image emulsions are described by Davey et al in U.S. Pat. No. 2,592,250, issued Apr. 8, 1952, and elsewhere in the literature. Other useful emulsions are described in U.S. Pat. No. 3,761,276, dated Sept. 25, 1973. Internal-image silver halide emulsions can be defined in terms of the increased maximum density obtained when developed with "internal-type" developers over that obtained when developed with "surface-type" developers. Suitable internal-image emulsions are thosee which, when measured according to normal photographic techniques by coating a test portion of the silver halide emulsion on a transparent support, exposing to a light-intensity scale having a fixed time between 0.01 and 1 second, and developing for 3 minutes at 20°C. in Developer A below ("internal-type" developer), have a maximum density at least five times the maximum density obtained when an equally exposed silver halide emulsion is developed for 4 minutes at 20°C. in Developer B described below ("surface-type" developer). Preferably, the maximum density in Developer A is at least 0.5 density unit greater than the maximum density in Developer B.

DEVELOPER A

| | |
|---|---|
| Hydroquinone | 15 g. |
| Monomethyl-p-aminophenol sulfate | 15 g. |
| Sodium sulfite (desiccated) | 50 g. |
| Potassium bromide | 10 g. |
| Sodium hydroxide | 25 g. |
| Sodium thiosulfate | 20 g. |
| Water to make one liter. | |

DEVELOPER B

| | |
|---|---|
| P-hydroxyphenylglycine | 10 g. |
| Sodium carbonate | 100 g. |
| Water to make one liter. | |

The internal-image silver halide emulsions when processed in the presence of fogging or nucleating agents provide direct positive silver images. Such emulsions are particularly useful in the above-described embodiment. Suitable fogging agents include the hydrazines disclosed in Ives U.S. Pat. Nos. 2,588,982 issued Mar. 11, 1952, and 2,563,785 issued Aug. 7, 1951; the hydrazides and hydrazones disclosed in Whitmore U.S. Pat. No. 3,227,552 issued Jan. 4, 1966; hydrazone quaternary salts described in Lincoln and Heseltine U.S. Pat. No. 3,615,615 issued Oct. 26, 1971; hydrazone containing polymethine dyes described in Spence and Janssen U.S. Pat. No. 3,718,470 issued Feb. 27, 1973; or mixtures thereof. The quantity of fogging agent employed can be widely varied depending upon the results desired. Generally, the concentration of fogging agent is from about 0.4 to about 8 grams per mole of silver in the photosensitive layer in the photosensitive element or from about 0.1 to about 2 grams per liter of developer if it is located in the developer. The fogging agents described in U.S. Pat. Nos. 3,615,615 and 3,718,470, however, are preferably used in concentrations of about 0.5 to 10.0 grams per mole of silver in the photosensitive layer.

The solarizing direct-positive silver halide emulsions useful in the above-described embodiment are well-known silver halide emulsions which have been effectively fogged either chemically, such as by the use of reducing agents, or by radiation to a point which corresponds approximately to the maximum density of the reversal curve as shown by Mees, *The Theory of the Photographic Process*, published by the Macmillan Co., New York, New York, 1942, pages 261–297. Typical methods for the preparation of solarizing emulsions are shown by Groves British Pat. No. 443,245, Feb. 25, 1936, who subjected emulsions to Roentgen rays "until an emulsion layer formed therefrom, when developed without preliminary exposure, is blackened up to the apex of its graduation curve"; Szaz British Pat. No. 462,730, Mar. 15, 1937, the use of eight light or chemicals such as silver nitrate, to convert ordinary silver halide emulsions to solarizing direct positive emulsions; and Arens U.S. Pat. 2,005,837, June 25, 1935, the use of silver nitrate and other compounds in conjunction with heat to effect solarization. Particularly useful are the fogged direct-positive emulsions of Berriman U.S. Pat. No. 3,367,778; Illingsworth U.S. Pat. Nos. 3,501,305, 3,501,306 and 3,501,307; and combinations thereof.

Other embodiments in which our imaging chemistry can be employed include the techniques described in U.S. Pat. Nos. 3,227,550, 3,227,551, 3,227,552 and 3,364,022.

Another embodiment of our invention uses the image-reversing technique disclosed in British Pat. No. 904,364, page 19, lines 1–41. In this system our dye-providing compounds may be used in combination with physical development nuclei in a nuclei layer contiguous to the photosensitive silver halide emulsion layer. The film unit contains a silver halide solvent, preferably in a rupturable container with the alkaline processing composition, and the photosensitive element contains an immobilizing coupler, which is capable of reacting with oxidized developer to form an immobile product. This embodiment also must include developing agents which are reactive with the immobilizing coupler. Preferred compounds include the primary aromatic amine developing agents such as p-aminophenols or p-phenylenediamines.

Negative silver halide emulsions useful in certain embodiments of this invention, such as the above, can comprise, for example, silver chloride, silver bromide, silver chlorobromide, silver bromoiodide, silver chlorobromodiode or mixtures thereof. The emulsions can be coarse- or fine-grain and can be prepared by any of the well-known procedures, e.g., single-jet emulsions such as those described in Trivelli and Smith, *The Photographic Journal*, Vol. LXXIX, May, 1939 (pp. 330–338), double-jet emulsions, such as Lippmann emulsions, ammoniacal emulsions, thiocyanate or thioether ripened emulsions such as those described in Nietz et al U.S. Pat. No. 2,222,264 issued Nov. 19, 1940; Illingsworth U.S. Pat. No. 3,320,069 issued May 16, 1967; and Jones U.S. Pat. No. 3,574,628 issued Apr. 13, 1971. The emulsions may be monodispersed regular-grain emulsions such as the type described in Klein and Moisar, *J. Phot. Sci.*, Vol. 12, No. 5, Sept./Oct., 1964 (pp. 242–251).

Another embodiment of our invention uses the image-reversing technique disclosed in British Pat. No. 904,364, page 19, lines 1–41. In this system our dye-providing compounds are used in combination with physical development nuclei in a nuclei layer contiguous to the photo-sensitive silver halide negative emulsion layer. The film unit contains a silver halide solvent, preferably in a rupturable container with the alkaline processing composition.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectivity sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181; 2,643,886; 2,653,732; 2,724,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color film unit according to this invention, each silver halide emulsion layer containing a dye image-providing material or having the dye image-providing material present in a contiguous layer may be separated from the other silver halide emulsion layers in the image-forming portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104; 3,043,692; 3,044,873; 3,061,428; 3,069,263; 3,069,264; 3,121,011; and 3,427,158.

Generally speaking, except where noted otherwise, the silver halide emulsion layers in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., gelatin, are about 1 to 5 microns in thickness. Of course, these thicknesses are approximate only and can be modified according to the product desired.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described in Minsk U.S. Pat. No. 2,882,156, issued Apr. 14, 1959, and basic polymeric mordants such as described in Cohen et al U.S. Pat. No. 3,625,694, issued Dec. 7, 1971; U.S. Pat. No. 3,709,690, issued Jan. 9, 1973; and U.S. application Ser. No. 400,778, filed Sept. 26, 1973 and now U.S. Pat. No. 3,898,088. See also U.S. application Ser. No. 412,992 of Burness et al, filed Nov. 5, 1973 and now U.S. Pat. No. 3,859,096.

Preferred mordants are cationic mordants such as polymeric compounds composed of a polymer having quaternary nitrogen groups and at least two aromatic nuclei for each quaternary nitrogen in the polymer cation (i.e., having at least two aromatic nuclei for each positively charged nitrogen atom), such polymeric compounds being substantially free of carboxy groups. Useful mordants of this type are comprised of units of the following formula in copolymerized relationship with units of at least one other ethylenically unsaturated monomer:

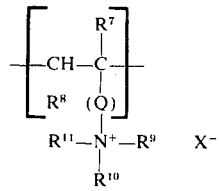

wherein $R^7$ and $R^8$ each represent a hydrogen atom or a lower alkyl radical (of 1 to about 6 carbon atoms) and $R^8$ can additionally be a group containing at least one aromatic nucleus (e.g., phenyl, naphthyl, tolyl); Q can be a divalent alkylene radical (of 1 to about 6 carbon atoms), a divalent arylene radical, a divalent aralkylene radical, a divalent arylenealkylene radical, such as

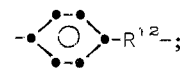

a

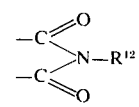

wherein $R^{12}$ is an alkylene radical, or $R^8$ can be taken together with Q to form a $$-C\underset{\displaystyle-C}{\overset{\displaystyle\nearrow O}{\diagdown}}N-R^{12}$$
$$\phantom{-C}\diagdown O$$

group; $R^9$, $R^{10}$ and $R^{11}$ can be alkyl, aralkyl or aryl, or $R^9$ and $R^{10}$ and the nitrogen atom to which they are attached can together with Q represent the atoms and bonds necessary to form a quaternized nitrogen-containing heterocyclic ring, and $X^-$ is a monovalent negative salt-forming radical or atom in ionic relationship with the positive salt-forming radical, wherein said polymer is substantially free of carboxy groups and wherein the positive salt forming radical of said polymer comprises at least two aryl groups for each quaternary nitrogen atom in said polymer. In one preferred embodiment, Q represents a phenylene or substituted phenylene radical and $R^9$, $R^{10}$ and $R^{11}$ are the same or different and represent alkyl groups, the sum of their carbon atoms exceeding 12. These preferred polymeric cationic mordants are described further in the above-mentioned U.S. Pat. No. 3,709,690 and U.S. application Ser. No. 400,778, incorporated herein by reference.

Other mordants useful useful in our invention include poly-4-vinylpyridine, the 2-vinyl pyridine polymer methyl-p-toluene sulfonate and similar compounds described in Sprague et al U.S. Pat. No. 2,484,430, issued Oct. 11, 1949, and cetyl trimethylammonium bromide, etc. Effective mordanting compositions are also described in Whitmore U.S. Pat. No. 3,271,148 and Bush U.S. Pat. No. 3,271,147, both issued Sept. 6, 1966.

Generally, good results are obtained when the image-receiving layer, preferably alkaline solution-permeable, is transparent and about 0.25 to about 0.40 mil in thickness. This thickness, of course, can be modified depending upon the result desired. The image-receiving layer can also contain ultraviolet absorbing materials to protect the mordanted dye images from fading due to ultraviolet light, brightening agents such as the stilbenes, coumarins, triazines, oxazoles, dye stabilizers such as the chromanols, alkylphenols, etc.

Use of a pH-lowering material in the dye image-receiving element of a film unit according to the invention will usually increase the stability of the transferred image. Generally, the pH-lowering material will effect a reduction in the pH of the image layer from about 13 or 14 to at least 11 and preferably 4–8 within a short time after imbibition. For example, polymeric acids as disclosed in U.S. Pat. No. 3,362,819, or solid acids or metallic salts, e.g., zinc acetate, zinc sulfate, magnesium acetate, etc., as disclosed in U.S. Pat. No. 2,584,030 may be employed with good results. Such pH-lowering materials reduce the pH of the film unit after development to terminate development and substantially reduce further dye transfer and thus stabilize the dye image.

An inert timing or spacer layer can be employed in the practice of our invention over the pH-lowering layer which "times" or controls the pH reduction as a function of the rate at which alkali diffuses through the inert spacer layer. Examples of such timing layers include gelatin, polyvinyl alcohol or any of those disclosed in U.S. Pat. No. 3,455,686. The timing layer may be effective in evening out the various reaction rates over a wide range of temperatures, e.g., premature pH reduction is prevented when imbibition is effected at temperatures above room temperature, for example, at 95°–100°F. The timing layer is usually about 0.1 to about 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc.

The alkaline processing composition employed in this invention is the conventional aqueous solution of an alkaline material, e.g., sodium hydroxide, sodium carbonate or an amine such as diethylamine, preferably possessing a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5 percent by weight of the processing composition is preferred which will impart thereto a viscosity of about 100 cp. to about 200,000 cp. In certain embodiments of our invention, an opacifying agent, e.g., $TiO_2$, carbon black, pH indicator dyes, etc., may be added to the processing composition.

While the alkaline processing composition used in this invention can be employed in a rupturable container, as described previously, to conveniently facilitate the introduction of processing composition into the film unit, other methods of inserting processing composition into the film unit could also be employed e.g., interjecting processing solution with communicating members similar to hypodermic syringes which are attached either to a camera or camera cartridge.

The alkaline solution-permeable, substantially opaque, light-reflective layer employed in certain embodiments of photographic film units of our invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layer, dark-colored opacifying agents, e.g., carbon black, nigrosine dyes, etc., may be added to it, or coated in a separate layer adjacent to the light-reflective layer.

The supports for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film, poly(ethyleneterephthalate) film, polycarbonate film, poly-α-olefins such as polyethylene and polypropylene film, and related films or resinous materials. The support can be from about 2 to about 9 mils in thickness.

The silver halide emulsions useful in our invention are well known to those skilled in the art and are described in Product Licensing Index, Vol. 92, Dec., 1971, publication 9232, p. 107, paragraph I, "Emulsion types"; they may be chemically and spectrally sensitized as described on page 107, paragraph III, "Chemical sensitization," and pp. 108–109, paragraph XV, "Spectral sensitization," of the above article; they can be protected against the production of fog and can be stabilized against loss of sensitivity during keeping by employing the materials described on p. 107, paragraph V, "Antifoggants and stabilizers," of the above article; they can contain development modifiers, hardeners, and coating aids as described on pp. 107–108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on p. 108, paragraph XI, "Plasticizers and lubricants," and paragraph VIII, "Vehicles," and p. 109, paragraph XVI, "Absorbing and filter dyes," of the above article; they and other layers in the photographic elements used in this invention may contain addenda which are incorporated by using the procedures described on p. 109, paragraph XVII, "Methods of addition," of the above article; and they can be coated by using the various techniques described on p. 109, paragraph XVIII, "Coating procedures," of the above article, the disclosures of which are hereby incorporated by reference.

It will be appreciated that there remains in the photographic element after transfer has taken place an imagewise distribution of dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. The imagewise distribution of dye may also diffuse out of the element into these baths, if desired, rather than to an image-receiving element. If a negative-working silver halide emulsion is employed in such photosensitive element, then a positive color image, such as a color transparency or motion-picture film, may be produced in this manner. If a direct-positive silver halide emulsion is employed in such photosensitive element, then a negative color image may be produced.

Preferably, when the desired dye image is retained in the image-forming unit, the image dye-providing materials are shifted (G is hydrolyzable acyloxy) and are incorporated in the silver halide emulsion layer. Improved processes are described in U.S. Ser. No. 422,390, filed Dec. 6, 1973.

The following examples are provided for a further understanding of the invention. The structures of all the compounds were confirmed by their infrared and NMR spectra and in some cases by elemental analysis. The notation $C_5H_{11}$-t as used herein is an abbreviation for t-pentyl.

4-Amino-N-[4-(2,4-di-t-pentylphenoxy)-butyl]-1-hydroxy-2-naphthamide may be prepared as follows: 1-hydroxy-N-[4-(2,4-di-t-pentylphenoxy)-butyl]-2-naphthamide (U.S. Pat. No. 2,474,293) is coupled with a diazotized p-anisidine

The azo group of the compound thus prepared may then be reduced with sodium dithionite ($Na_2S_2O_4$) to the corresponding amine (see also U.S. Pat. No. 3,458,315, column 10).

EXAMPLE 1 - PREPARATION OF COMPOUND NO. 1

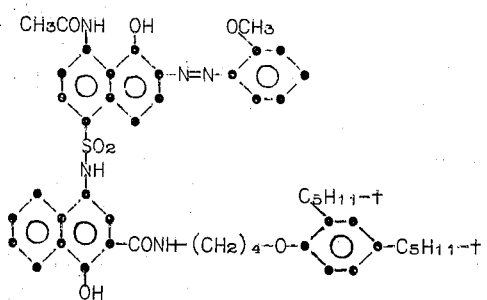

To 400 ml. of dry pyridine, under nitrogen, at 0°C. were added 14.7 g. (.03 mol) of 4-amino-N-[4-(2,4-di-tertpentylphenoxy)butyl]-1-hydroxy-2-naphthamide. To this solution 12.6 g. (.029 mol) of 4-acetamido-5-hydroxy-6-(2-methoxyphenylazo)-1-naphthalenesulfonyl chloride were added. The reaction mixture was stirred at 0°C. for one hour and then poured into a mixture of 500 ml. of concentrated hydrochloric acid and 500 ml. of ice water. The resulting solid was collected on a filter funnel and dried. After one recrystallization from acetone, the yield of pure compound was 12.9 g. (50 percent), m.p. 209°-13°C. dec. The 4-acetamido-5-hydroxy-6-(2-methoxyphenylazo)-1-naphthalenesulfonyl chloride was prepared by adding 10 ml. of N,N-dimethylformamide to a slurry of 17.5 g. (0.04 mol) of sodium 4-acetamido-5-hydroxy-6-(2-methoxyphenylazo)-1-naphthalenesulfonate in 250 ml. of phosphoryl chloride. The mixture was stirred at room temperature for 30 minutes and the solid collected on a filter funnel. The solid was slurried in ice water, collected on a filter funnel and dried to yield 17.3 g. The solid was suspended in ethyl alcohol, filtered off again and dried to yield 13.3 g. (76 percent). The 4-acetamido-5-hydroxy-6-(2-methoxyphenylazo)-1-naphthalenesulfonic acid, sodium salt, was obtained by adding dropwise 14.0 g. (0.2 mol) of sodium nitrite in 25 ml. of water to a solution of 24.6 g. (0.2 mol) of o-anisidine in 200 ml. of 2N hydrochloric acid at less than 3°C. This solution was added portionwise to a chilled solution of 80.4 g. (0.2 mol) of 8-acetamido-1-acetoxy-5-naphthalenesulfonic acid, pyridine salt, in 300 ml. of 2N sodium hydroxide. The mixture was stirred for one hour, and the solid collected on a filter funnel. It was slurried in ethyl alcohol, collected on a filter funnel and dried to yield 84.3 g. (97 percent). The 8-acetamido-1-acetoxy-5-naphthalenesulfonic acid, pyridine salt, was obtained by the acetylation of "S Acid" in acetic anhydride and pyridine at 80° C. The yield was 70.0 g. (87 percent), m.p. 209°-210° dec.

EXAMPLE 2 - PREPARATION OF COMPOUND NO. 2

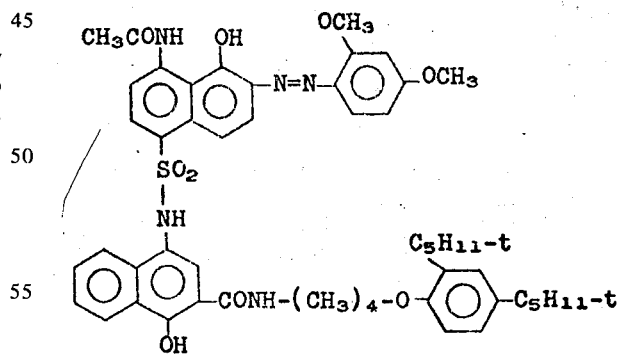

This compound was prepared in a manner similar to Example 1. The yield was 42 percent, m.p. 213°-4°C. dec. The sulfonyl chloride used was prepared by a method similar to that used in Example 1 in 52 percent yield and the sulfonic acid used was prepared in 86 percent yield in a manner similar to that used in Example 1.

EXAMPLE 3 - PREPARATION OF COMPOUND NO. 3

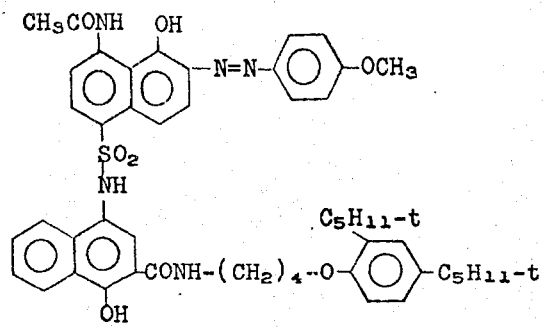

This compound was prepared in a manner similar to that used in Example 1 in 42 percent yield, m.p. 231°–2°C. The 4-acetamido-5-hydroxy-6-(4-methoxyphenylazo)-1-naphthalenesulfonyl chloride was prepared in 95 percent yield by the method used in Example 1. The sulfonic acid was also prepared via the same method as in Example 1 in 96 percent yield.

EXAMPLE 4 - PREPARATION OF COMPOUND NO. 4

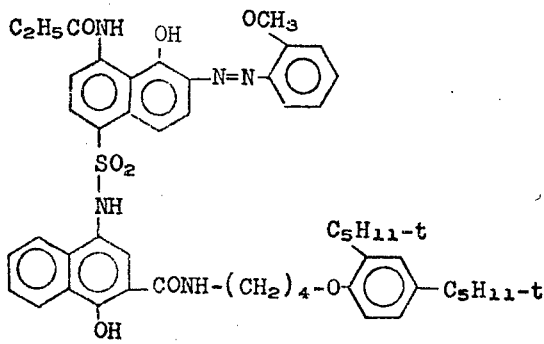

This compound was prepared in a manner similar to that used in Example 1. The yield was 44 percent, m.p. 195°–6°C dec. from 5-hydroxy-6-(2-methoxyphenylazo)-4-propionamido-1-naphthalenesulfonyl chloride, which was prepared in 67 percent yield by the method shown in Example 1. Sodium 5-hydroxy-6-(2-methoxyphenylazo)-4-propionamido-1-naphthalenesulfonate was prepared in a manner similar to that used in Example 1 in 100 percent yield.

EXAMPLE 5 - PREPARATION OF COMPOUND NO. 5

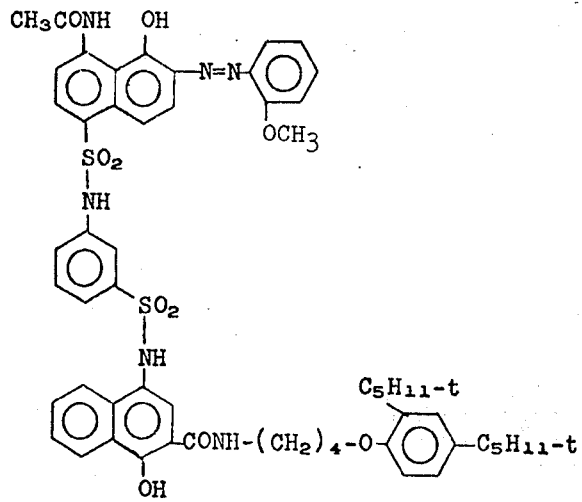

To a solution of 6.45 g. (0.01 mole) of 4-(3-aminobenzenesulfonamido)-N-[4-(2,4-di-tert-pentylphenoxy)butyl]-1-hydroxy-2-naphthamide in 100 ml. of dry pyridine at 0°C., under nitrogen, were added 4.3 g. (.01 mol) of 4-acetamido-5-hydroxy-6-(2-methoxyphenylazo)-1-naphthalenesulfonyl chloride. The mixture was stirred at 5°C. for thirty minutes and then warmed until the solids dissolved. The solution was stirred without further heating an additional thirty minutes, then poured into 200 ml. of ice and 100 ml. of concentrated hydrochloric acid. The resulting solid was collected on a filter funnel and dried. After one recrystallization from acetic acid, the yield was 6.1 g. (59 percent), m.p. 234°–6°C.

EXAMPLE 6 - PREPARATION OF COMPOUND NO. 6

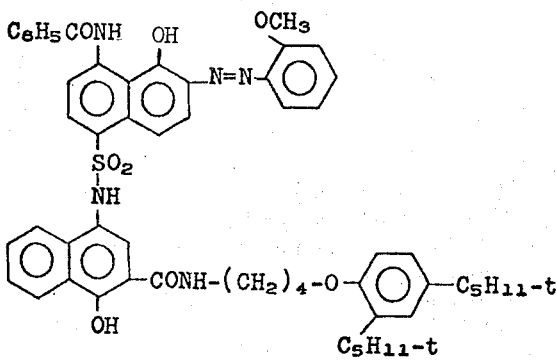

This compound was prepared in a manner similar to that used for Example 1. The yield was 64 percent, m.p. 232°–4°dec. The 4-benzamido-5-hydroxy-6-(2-methoxyphenylazo)-1-naphthalenesulfonyl chloride used was prepared by the same method used for Example 1 giving a 69 percent yield, and the sulfonic acid used was prepared in 71 percent yield in a manner similar to that used in Example 1.

EXAMPLE 7 - PREPARATION OF COMPOUND NO. 7

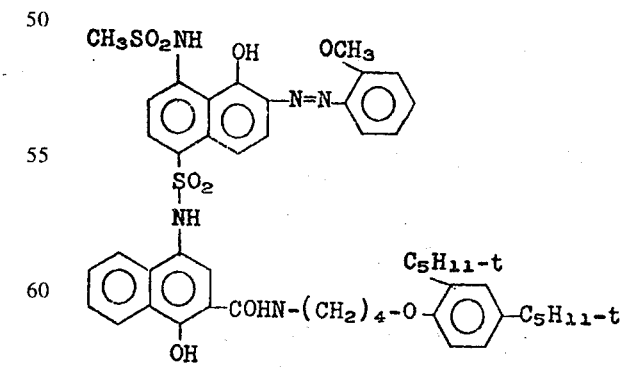

This compound was prepared in a manner similar to that used for Example 1. The yield was 51 percent, m.p. 216°–8°C. The 5-hydroxy-4-methanesulfonamido-6-(2-methoxyphenylazo-1-naphthylenesulfonyl chloride used was prepared via the same method as used in Example 1 in 81 percent yield and the corresponding sulfonic acid used was also prepared in a manner similar to that used to obtain Example 1. The yield was 98 percent.

EXAMPLE 8 - PREPARATION OF COMPOUND NO. 8

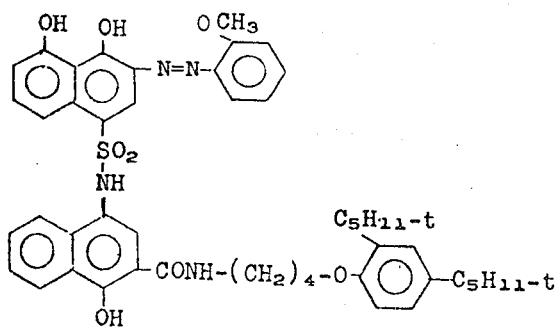

To 40 ml. of pyridine under N₂ at 0°C. were added 1.0 g. of 4,5-dihydroxy-3-(2-methoxyphenylazo)-1-naphthylenesulfonyl chloride and 1.22 g. of 4-amino-N-[4-(2,4-di-t-phenylphenoxy)-1-hydroxy-2-naphthamide and stirred for 1 hour. The reaction mixture was poured into ice containing 70 ml. concentration hydrochloric acid and the crude product removed by extraction with ether. The residue from the ether layer was chromatographed on silica gel followed by recrystallization from benzene. The yield was 0.7 g. of pure product, m.p. 186°–189°. The 4,5-dihydroxy-3-(2-methoxyphenylazo)-1-naphthylenesulfonyl chloride was prepared by stirring a suspension of 5.0 g. of sodium 4,5-dihydroxy-3-(2-methoxyphenylazo)-1-naphthalenesulfonate and 74 ml. of thionyl chloride with 2 g. of dimethylformamide for 1.5 hours at room temperature. The thionyl chloride was largely removed under reduced pressure and the residue quenched in ice to give a solid. Trituration in a small volume of ethanol gave 2.7 g. of the acid chloride. The sodium 4,5-dihydroxy-3-(o-methoxyphenylazo)naphthylenesulfonate was prepared by diazotization of 0.003 mole o-anisidine prepared in dilute hydrochloric acid and coupling with 10 g. of sodium 4,5-dihydroxynaphthalenesulfonate in the presence of excess sodium acetate. 8.0 g. of dye was obtained.

EXAMPLE 9 - PREPARATION OF COMPOUND NO. 9

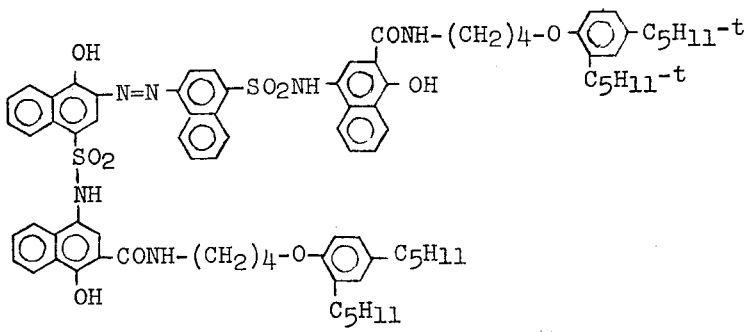

A solution of 0.5 g. of 2-(4-chlorosulfonyl-1-naphthylazo)-1-hydroxy-4-naphthalenesulfonyl chloride, 1.1 g. of 4-amino-N-[4-(2,4-di-t-pentylphenoxy)butyl]-1-hydroxy-2-naphthamide and 0.2 g. of pyridine in 75 ml. of chloroform under N₂ was stirred at room temperature for 5 hours. The volume was reduced and the chloroform solution chromatographed on silica gel. The fraction brought off the column with a 1:1 mixture of benzene and chloroform provided 0.5 g. of the desired product, m.p. 151°–5°C. The 2-(4-chlorosulfonyl-1-naphthylazo)-1-hydroxy-4-naphthylenesulfonyl chloride was obtained by treating 2.0 g. of the disodium salt of 1-hydroxy-2-(4-sulfo-1-naphthylazo)-4-naphthylenesulfonic acid with 30 ml. of thionyl chloride and 1 ml. of dimethylformamide at room temperature for 1 hour. The thionyl chloride was removed under reduced pressure and the residue treated with ice water to give a solid which was collected, washed with water and dried. The solid was dissolved in chloroform, treated with magnesium sulfate and precipitated with hexane. The 1-hydroxy-2-(4-sulfo-1-naphthylazo)-4-naphthylenesulfonic acid, disodium salt, was prepared by the diazo coupling of the diazonium salt of 1-naphthylamine-4-sulfonic acid with sodium 1-naphthol-4-sulfonate under basic conditions in the standard manner.

EXAMPLE 10 - PREPARATION OF COMPOUND NO. 10

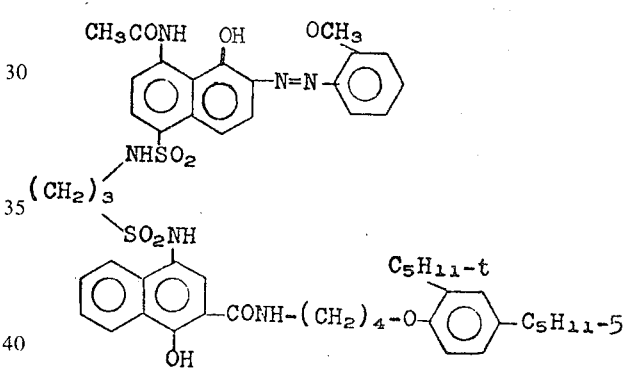

To a stirred suspension of 4.8 g. (11 mmol) of 4-acetamido-5-hydroxy-6-(2-methoxyphenylazo)-1-naphthalene-sulfonyl chloride and 8.0 g. (12.3 mmol) of 4-(3-aminopropanesulfonamido)-N-[4-(2,4-di-tert-butylphenoxy)butyl]-1-hydroxy-2-naphthamide hydrochloride in 200 ml. of tetrahydrofuran under nitrogen were added 1.29 g. (10 mmol) of diisopropylethylamine and then dropwise 1.7 g. of tetramethylguanidine. The reaction mixture was then heated to 70°C. for 2 hours. Upon cooling, it was poured into 1 liter of cold water containing 5 ml. of concentrated hydrochloric acid. The resulting solid was removed by filtration and treated with 600 ml. of boiling acetic acid. The hot solution was filtered, leaving a residue. The filtrate on cooling deposited a solid which was then dissolved in tetrahydrofuran and precipitated with a 10-fold excess of hexane. The resulting precipitate was collected and dried, yielding 7.0 g. (61 percent), m.p. 226°–9°C.

Additional dye-releasing redox compounds were prepared by the methods described below in Examples 11–18. Examples 11–15 and 18 were prepared from the carrier compound A, 4-(3-aminobenzenesulfonamido)-N-[4-(2,4-di-t-pentylphenoxy)butyl]-1-hydroxy-2-naphthamide. Examples 16 and 17 were made from carrier compound B, 4-(4-aminobenzenesulfonamido)-N-[4-(2,4-di-t-pentylphenoxy)-butyl]-1-hydroxy-2-naphthamide, which differs structurally only in the p- (vs. m-) amino group in the benzenesulfonamido substituent. The "EEDQ" reqgent was N-ethoxycarbonyl-2-ethoxy-1,2-dihydroquinoline, commercially available. The structures of all of the compounds were confirmed by their infrared and NMR spectral and in some cases elemental analysis.

EXAMPLE 11 - PREPARATION OF COMPOUND NO. 11

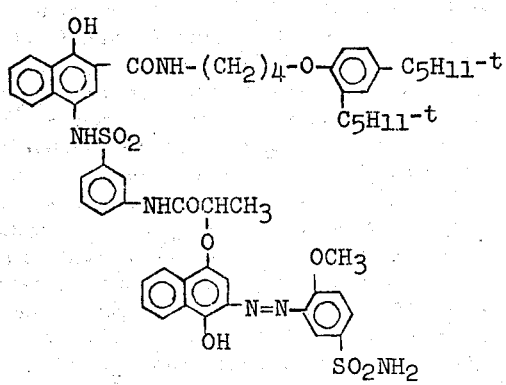

Predistilled dimethylformamide (250 ml.) was added to a dried flask containing 22.2 g. (0.05 mol) of α-[4-hydroxy-3(2-methoxy-5-sulfamoylphenylazo)-1-naphthyloxy]propionic acid, 32.5 g. (0.05 mol) of carrier compound A and 12.3 g. (0.05 mol) of EEDQ. The reaction was protected from atmospheric moisture and stirred at room temperature for 4 hr. The reaction was cooled in an ice bath and a solution of 25 g. (0.3 mol) of sodium bicarbonate in 500 ml. of water added in portions to precipitate an oily solid. An additional 500 ml. of water were added to complete the precipitation. The liquid was decanted and the product washed with water. The oily product was transformed into a crystalline material by stirring with 250 ml. water for 1 1/2 hr. The solid was collected, washed with water and dried to yield 52.0 g. (97 percent). This crude product was recrystallized from 300 ml. of acetic acid, yielding 38.0 g. ( 71 percent) of pure material, m.p. 168°–171°C. dec. The α-[4-hydroxy-3-(2methoxy-5-sulfamoyl-phenylazo)-1-naphthyloxy]propionic acid used was prepared by the following technique. A solution of 6.9 g. (0.10 mol) of sodium nitrite in 150 ml. of water was added dropwise to a cold, stirred solution of 20.2 g. (0.10 mol) of 4-amino-3-methoxybenzenesulfonamide (R. Adams, P. H. Long and A. Jeanes, *J. Am. Chem. Soc.*, 61, 2342, 1939) and 22 ml. (0.26 mol) of concentrated hydrochloric acid in 450 ml. of water. The resulting diazonium solution was run into a stirred solution of 23.2 g. (0.10 mol) of α-[4-hydroxy-1-naphthyloxy]propionic acid (see U.S. Pat. No. 3,365,441), 24.6 g. (0.30 mol) of sodium acetate and 4.5 g. (0.11 mol) of sodium hydroxide in 1 liter of water which had been cooled to 10° C. After complete addition, the reaction was stirred for 1 hr. at room temperature. The resulting slurry warmed to 50° C. and filtered. The solid product was washed with 500 ml. of 50° C. water and dried to give 42.1 g. (95 percent yield) of crude dye, m.p. 209°–211° C. dec. Recrystallization from acetic acid yielded dye, m.p. 216°–218° C. dec.

EXAMPLE 12 - PREPARATION OF COMPOUND NO. 12

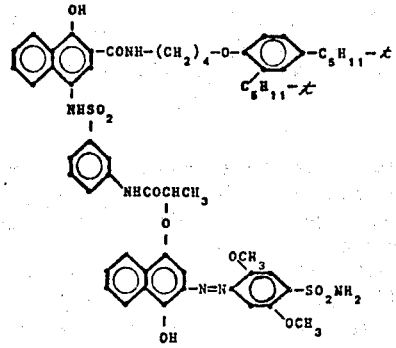

The above compound was prepared on a 5-mmol. scale from α-[3-(2,5-dimethoxy-4-sulfamoylphenylazo)-4-hydroxy-1-naphthyloxy]propionic acid using the procedure described in Example 11 and a 7-hr. reaction time. The crude yield (98 percent) of product, 5.4 g., was recrystallized from 160 ml. acetonitrile, and 2.4 g., (46 percent) yield) of pure product was obtained, m.p. 223°–226° C. dec. The α-[3-(2,5-dimethoxy-4-sulfamoylphenylazo)-4-hydroxy-1-naphthyloxy]propionic acid used was prepared on a 50-mmol. scale from 2,5-dimethylsulfanilamide (see British Pat. No. 681,653) using the procedure described in Example 11 above. The crude product (21.5 g.) was recrystallized from 500 ml. of acetic acid to yield 12.4 g. (52 percent) of pure dye, m.p. 230°–231° C. dec.

EXAMPLE 13 - PREPARATION OF COMPOUND NO. 13

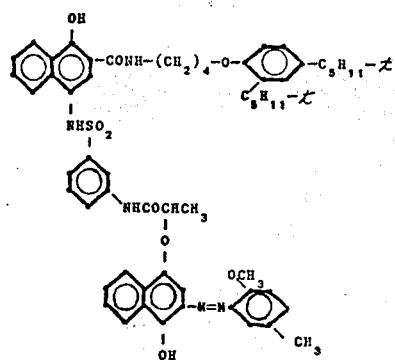

This compound was prepared on a 10-mmol. scale from α-[4-hydroxy-3-(2-methoxy-5-methylphenylazo)-1-naphthyloxy]propionic acid (see U.S. Pat. No. 3,365,441), using the procedure outlined in Example 11 above and a 16-hr. reaction time. The crude yield of 10.1 g. was recrystallized from 100 ml. of acetic acid to return 6.2 g. (62 percent yield) of pure material, m.p. 135°–138° C. dec.

EXAMPLE 14 - PREPARATION OF COMPOUND NO. 14

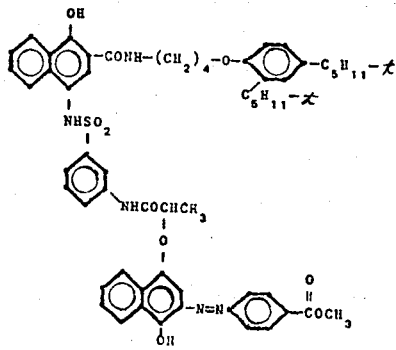

This compound was prepared on a 5-mmol. scale from α-[4-hydroxy-3-(4-methoxycarbonylphenylazo)-1-naphthyloxy]propionic acid, using the procedure set forth in Example 11, with a reaction time of 60 hr. The quantitative yield of product was recrystallized from 150 ml. of acetonitrile to return 3.15 g. (68 percent) yield of pure compound, m.p. 224°–226° C. dec. The α-[4-hydroxy-3-(4-methoxycarbonylphenylazo)-1-naphthyloxy]propionic acid used was prepared as follows. Methyl p-aminobenzoate (50 mmol., 7.5 g.) was dissolved in 40 cc. of a 1:5 mixture of propionic/acetic acids at 50° C., then cooled to 0° C. To this solution a solution of 3.45 g. (0.05 mol) of sodium nitrite in 25 cc. of water was rapidly added with stirring, along with 50 g. of ice. After stirring 10 min. at 0° C., the diazonium salt solution was added to 11.6 g., 50 mmol. of α-[4-hydroxy-1-naphthyloxy]propionic acid in 100 cc. of the above 1:5 acid mixture, also at 0° C. The stirred reaction mixture was allowed to warm to room temperature and 100 cc. of saturated sodium acetate solution was added. After 1 additional hr. of stirring at room temperature, the reaction mixture was filtered to remove the solid dye. Digestion of the dye in 500 cc. of methanol containing acetic acid followed by cooling, filtration and washing with water provided 11.5 g. (58.5 percent) of dye.

EXAMPLE 15 - PREPARATION OF COMPOUND NO. 15

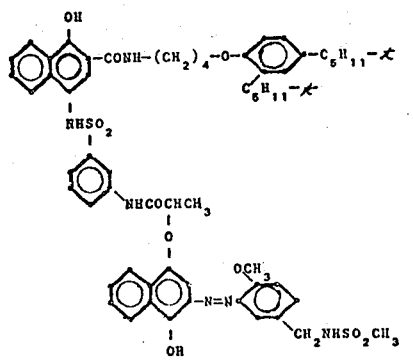

This compound was prepared on a 5-mmol. scale, using the procedure described in Example 11 with a reaction time of 16 hr. The propionic acid employed in this example was α- 4-hydroxy-3-[2-methoxy-5-(methanesulfonamidomethyl)phenylazo]-1-naphthyloxypropionic acid. The 91 percent (5.0 g.) crude yield was recrystallized from 150 ml. acetonitrile to yield 3.3 g. (60 percent) of pure material, m.p. 215°–217° C. dec. The α- 4-hydroxy-3-[2-methoxy-5-(methanesulfonamidomethyl)phenylazo]-1-naphthyloxy -propionic acid used was prepared on a 13-mmol. scale in a procedure similar to that used to prepare the dye in Example 11, using 2-methoxy-5-(methylsulfonamidomethyl)aniline as the starting material. The crude product was recrystallized from acetonitrile to yield 3.9 g. (63 percent), m.p. 219°–221° C. dec. the 2-methoxy-5-(methanesulfonamidomethyl)aniline used was prepared by catalytic hydrogenation of 6.8 g. (0.0262 mol) of N-(4-methoxy-3-nitrobenzyl)methanesulfonamide in 180 cc. of ethanol with 150 mg. of 10 percent palladium on carbon at a pressure of 60 psi. Upon removal of the catalyst, the ethanol was removed and the resulting crystalline residue recrystallized from ethanol-water to provide 4.3 g. of white plates, m.p. 100°–101° C. (80 percent yield). The N-(4-methoxy-3-nitrobenzyl)methanesulfonamide used was prepared by treatment of a suspension of 11.0 g. (0.05 mol) of 4-methoxy-3-nitrobenzylamine hydrochloride in 50 cc. dimethylformamide and 12.0 g. of triethylamine with 6.0 g. (0.05 mol) of methanesulfonyl chloride added dropwise over 15 min. with external cooling. The reaction mixture was stirred at room temperature for 1 hr., then poured into ice containing 10 cc. of concentrated hydrochloric acid. The solid which precipitated was collected, washed with water, then dissolved in dilute sodium hydroxide. The undissolved residue was removed by extraction with chloroform. Neutralization of the basic solution with hydrochloric acid gave a white solid which, upon recrystallization from methanol, provided 5.3 g. of pure product (41 percent yield), m.p. 130°–131° C. The 4-methoxy-3-nitrobenzylamine hydrochloride used above was prepared by adding to a solution of 15.3 g. (0.1 mol) of o-nitroanisole in 50 cc. of concentrated sulfuric acid 15.4 g. (0.1 mol) of N-hydroxymethyltrifluoroacetamide (*Org. Reactions*, 14, 130) at 25° C. with stirring. After stirring for 2 hr. at room temperature, the reaction mixture was poured into 500 g. of ice. The resulting slurry was heated at reflux for 18 hr. Upon cooling, the reaction mixture was made basic with 50 percent sodium hydroxide and extracted with ether. The ether extract was dried over magnesium sulfate and filtered. Addition of anhydrous hydrogen chloride caused a white solid to precipitate which was collected to provide 11.5 g. of a hydroscopic solid (53 percent yield), m.p. 225° C. dec.

EXAMPLE 16 - PREPARATION OF COMPOUND NO. 16

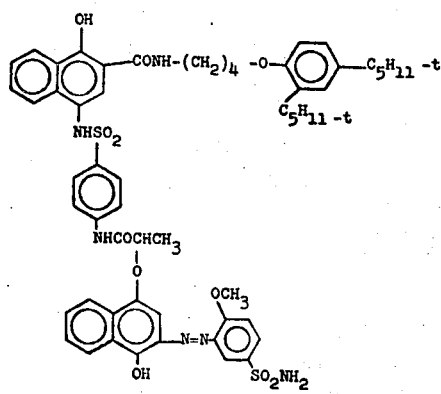

A solution of 1.0 g. of α-[4-hydroxy-3-(2-methoxy-5-sulfamoylphenylazo)-1-naphthyloxy]propionic acid, 1.5 g. of carrier compound B, and 0.55 g. of EEDQ (each 2.2 mmole) in 20 ml. of predistilled dimethylformamide was stirred on a steam bath for ½ hr., and protected from atmospheric moisture. The reaction was cooled in an ice bath and worked up with aqueous sodium bicarbonate as described in Example 11. The crude product (1.6 g., m.p. 148°–153° C., 62 percent yield) was recrystallized from 150 ml. acetonitrile to yield 0.55 g. (21 percent) of material, m.p. 218° C. dec.

EXAMPLE 17 - PREPARATION OF COMPOUND NO. 17

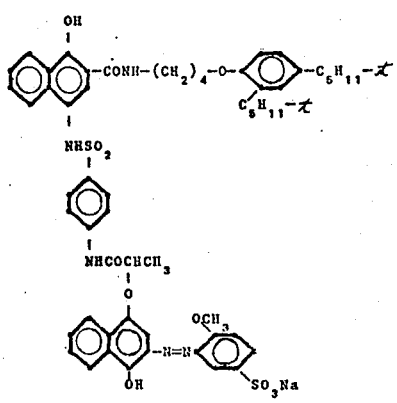

To a slurry of 4.0 g. of α-[4-hydroxy-3-(2-methoxy-5sulfophenylazo-1-naphthyloxy]propionic acid, monosodium salt, in 100 ml. predistilled dimethylformamide, stirred at room temperature for ½ hr. under nitrogen was added a solution of 1.25 g. of EEDQ in 25 ml. of dry dimethylformamide with further stirring. After 15 min., 3.2 g. of carrier compound B were added and the reaction heated on a stam bath for ½ hr. The hot reaction mixture was filtered to remove colorless, insoluble material, the filtrate cooled, diluted with 700 ml. of water and acidified with 10 ml. of concentrated hydrochloric acid. The oily precipitate which was collected by filtration crystallized on stirring in water. The solid was collected and dried, yielding 3.2 g. It was slurried in 100 ml. of chloroform, the solution filtered to remove solids, and the filtrate combined with hexane to precipitate a solid. Unsuccessful attempts at purification culminated in chromatography on 100 g. of deactivated silica gel. The column was eluted with chloroform and chloroform/methanol mixtures through pure methanol. This procedure yielded 0.65 g. of pure material, m.p. 218°–221° C.

The α-[4-hydroxy-3-(2-methoxy-5-sulfophenylazo)-1-naphthyloxy]propionic acid, monosodium salt, used was prepared as follows. A solution of 0.69 g. (10 mmol.) of sodium nitrite in 25 ml. of water was added dropwise to a stirred solution of 2.0 g. (0.01 mol) of sodium 3-amino-4-methoxybenzenesulfonate (R. Gnehm and O. Knecht, J. prakt. Chem., (2), 74, 98, 1906) and 2.1 ml. (25 mmol) of concentrated hydrochloric acid in 60 ml. of water which had been cooled in an ice bath. The resulting diazonium solution was then added in portions to a solution of 2.3 g. (10 mmol.) of α-[4-hydroxy-1-naphthyloxy]propionic acid and 1.7 g. (40 mmol.) of sodium hydroxide in 100 ml. of water which had been cooled in an ice bath. After 178 hr. of stirring, the reaction was acidified with 4.0 ml. of concentrated hydrochloric acid to give a slurry. The slurry was warmed and 70 g. of sodium chloride was added. The slurry was cooled, and the solid filtered off and dried. A total of 7.9 g. (theoretical yield was 4.7 g.) of solid was obtained which consisted of the desired dye and sodium chloride.

EXAMPLE 18 - PREPARATION OF COMPOUND NO. 18

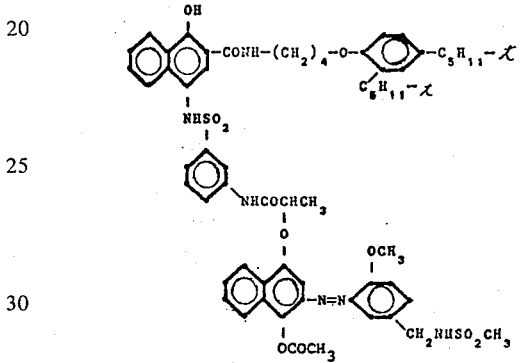

This compound was prepared from a hydrolyzable "shifted dye," a preformed azonaphthol acetate. A mixture of 0.90 g. of α-[4-acetoxy-3-(2-methoxy-5-methanesulfonamidomethylphenylazo)-1-naphthyloxy]propionic acid, 1.13 g. of carrier compound A, and 0.45 g. of EEDQ (each 1.7 mmol.) in 45 ml. of absolute ethanol was stirred at room temperature for 1 hr., followed by 1 hr. at reflux on a steam bath. The hot solution was filtered to remove traces of solid, and the filtrate evaporated under vacuum to leave a solid. The crude product was chromatographed on silica gel to provide 0.55 g. (35 percent yield) of pure material, m.p. 179°–182° C. dec. Alkaline hydrolysis of the product yielded the dye of Example 15.

The α-[4-acetoxy-3-(2-methoxy-5-methanesulfonamidomethylphenylazo)-1-naphthyloxy]propionic acid used was prepared as follows. A solution of 3.6 g. (7.5 mol) of α-[4-hydroxy-3-(2-methoxy-5-methanesulfonamidomethylphenylazo)-1-naphthyloxy]-propionic acid in 60 ml. (0.75 mol) of dry pyridine (Karl Fischer Grade) was cooled in an ice-isopropanol bath to −5° C., additional 1.0 ml. (0.004 mol) of acetyl chloride was added and the reaction stirred for ½ hr. Pouring the reaction onto a solution of 78 ml. (0.9 mol) of concentrated hydrochloric acid in 250 ml. of ice water precipitated the product which was collected and dried under vacuum at room temperature. The yield was 3.25 g. (84 percent) of product, m.p. 98°–106° C., dec.

EXAMPLE 19 - PHOTOGRAPHIC TESTING

The dye-releasing redox (DRR) compounds were tested for reactivity and diffusibility of their released dyes to a receiving element. Each DRR compound was dissolved in an equal weight of diethyllauramide and finely dispersed in gelatin. The dispersion was added to a 0.8 monodispersed negative-working gelatino-silver bromide emulsion which was coated on a polyester film support, the coverage of DRR being about $1.1 \times 10^{-5}$ moles/dm$^2$; silver - 9.2 mg/dm$^2$; and gelatin - 32 mg/dm$^2$. An overcoat layer of 8.6 g/dm$^2$ of gelatin, hardened by formaldehyde was then applied.

A. Image discrimination - A sample of the above coating was exposed through a step-wedge and then laminated to a mordantcontaining receiving element with a viscous processing composition (goo) by passing the "sandwich" between a pair of juxtaposed pressure-applying rollers. The receiving element consisted of a paper support on which was coated a mixture of gelatin (21 mg/dm$^2$) and a mordant, poly[styrene-co-N-benzyl-N,N-dimethyl-N-(3-maleimidopropyl)ammonium chloride] (21 mg/dm$^2$). The goo contained per liter of solution: 20 g. sodium hydroxide, 0.75 g. 4-hydroxymethyl-4-methyl-1-phenyl-3-pyrazolidone, 10 g. potassium bromide, and 25 g. hydroxyethylcellulose.

After 60 seconds, the receiver was peeled apart and washed in water to adjust the pH to about 7. Good image density in the exposed areas was obtained with very practically no transfer of dye in the unexposed areas. The Dmax and Dmin for each transfer is given under image discrimination in the table.

B. Spectrophotometry - The spectra of the released dyes when adsorbed to the mordant on a transparent support were measured spectrophotometrically. The maximum wavelength ($\lambda$ max) and the bandwidth in nm at one-half the density at the $\lambda$ max of the curve for each dye is also given in the table. This "half band width" along with the $\lambda$ max is indicative of hue, the brightness and purity of color being greater, the smaller the half band width.

C. Dye-transfer in receiving element - Another sample of an emulsion coating containing the DRR compound was fogged by exposure to light and processed by passing it as a "sandwich" with an image receiving element and viscous developing composition (goo) between a pair of juxtaposed pressure-applying rollers. The developer layer thickness of the resulting laminate ranged from about 0.075 to 0.10 mm. The receiving element had the following structure (the coverages in mg/dm$^2$ are shown in parenthesis):

| Carbon (27) + Gelatin (17) |
| --- |
| TiO$_2$ (215) + Gelatin (21) |
| Mordant* (21) + Gelatin (11) |
| Cellulose acetate support |

*same as above

The "goo" contained 20 g. sodium hydroxide, 0.75 g. 4-hydroxymethyl-4-methyl-1-phenyl-3-pyrazolidone, 10 g. potassium bromide and 25 g. hydroxyethylcellulose, all per liter of solution. Upon application of the goo to the fogged emulsion layer, the dyes are released and diffuse through the carbon and titania layers to the mordant layer. The density of the dyes on the mordant layer was read through the support by means of a reflection densitometer after intervals of 30, 60 and 120 seconds at 24°C. The increase in density, as indicated by the values in the table, is a measure of the rate of release and also of the diffusivity of the dyes.

PHOTOGRAPHIC PROPERTIES

| Compound of Example | $\lambda$ max (nm) | Half-band width (nm) | Image Discrimination Coverage (moles × 10$^{-6}$ per dm$^2$) | Dmax | Dmin | Coverage (moles × 10$^{-6}$ per dm$^2$) | I-N-R Dye Transfer Density after 30 sec | 60 sec | 120 sec |
| --- | --- | --- | --- | --- | --- | --- | --- | --- | --- |
| 1 | 531 | 103 | 11 | 2.80 | 0.50 | 11 | 1.70 | 2.33 | >2.5 |
| 2 | 540 | 124 | 11 | 2.80 | 0.45 | 11 | 0.67 | 1.24 | 2.03 |
| 3 | 530 | 135 | 6 | 1.36 | 0.25 | 11 | 0.73 | 1.40 | 2.04 |
| 4 | 537 | 112 | 6 | 1.74 | 0.60 | 6 | 0.56 | 0.97 | 1.41 |
| 5 | 529 | 115 | 11 | 2.25 | 0.50 | 11 | 0.94 | 1.92 | 2.50 |
| 6 | 536 | 128 | 11 | 1.40 | 0.32 | 11 | 0.39 | 0.69 | 1.11 |
| 7 | 532 | 112 | 6 | 1.74 | 0.45 | 6 | 0.55 | 0.85 | 1.09 |
| 8 | 520 | 124 | 11 | — | — | 11 | 0.53 | 1.16 | 1.78 |
| 9 | 539 | 124 | 11 | 2.90 | 0.34 | 11 | 0.47 | 1.33 | 2.09 |
| 10 | 529 | 120 | 11 | 1.96 | 0.39 | 11 | 0.74 | 1.17 | 1.64 |
| 11 | 523 | 105 | 11 | 3.0 | 0.40 | 6 | 1.44 | 2.33 | 2.50 |
| 12 | 528 | 110 | 11 | 3.4 | 0.65 | 6 | 1.27 | 2.31 | 2.50 |
| 13 | 529 | 111 | 6 | 1.34 | 0.38 | 6 | 1.45 | 2.36 | 2.50 |
| 14 | 507 | 112 | 11 | 2.24 | 0.26 | 6 | 0.81 | 1.59 | 2.33 |
| 15 | 531 | 112 | 6 | 1.86 | 0.50 | 6 | 0.67 | 1.04 | 1.20 |
| 16 | 524 | 111 | — | — | — | 11 | 0.90 | 1.65 | 2.10 |
| 17 | 530 | 106 | 6 | 1.76 | 0.45 | 11 | .80 | 1.42 | 1.86 |
| 18 | 531 | 112 | 6 | 1.70 | 0.50 | 6 | 0.47 | 0.84 | 1.1 |

As can be seen from the data above, the dyes are promptly released and diffuse rapidly.

EXAMPLE 20

An integral multicolor photosensitive element is prepared by coating the following layers in the order recited on a transparent cellulose acetate film support:
1. image-receiving layer of copoly[styrene-N-benzyl-N,N-dimethyl-N-(3-maleimidopropyl)ammonium chloride] (200 mg./ft.$^2$) and gelatin (100 mg./ft.$^2$);
2. reflecting layer of titanium dioxide (2000 mg./ft.$^2$) and gelatin (200 mg./ft.$^2$);
3. opaque layer of carbon black (250 mg./ft.$^2$) and gelatin (312 mg./ft.$^2$);
4. cyan image dye-providing compound (65 mg./ft.$^2$) having the formula

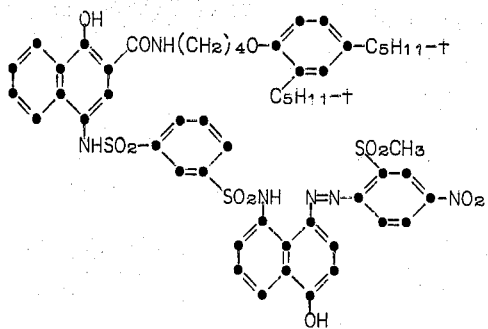

and gelatin (100 mg./ft.²);

5. red-sensitive, internal-image gelatin-silver chlorobromide emulsion (100 mg. gelatin/ft.² and 125 mg. silver/ft.²), 2,5-di-sec-dodecylhydroquinone (25 mg./ft.²) and nucleating agent formyl-4-methylphenylhydrazine (1 g./mole of silver);
6. interlayer of gelatin (100 mg./ft.²) and 2,5-di-sec-dodecylhydroquinone (50 mg./ft.²);
7. magenta image dye-providing Compound 11 (150 mg./ft.²) prepared in Example 11 and having the formula

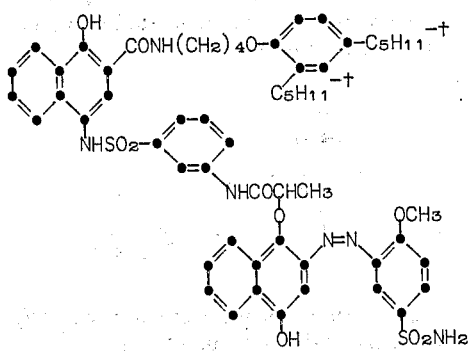

and gelatin (175 mg./ft.²);

8. green-sensitive, internal-image gelatin-silver chlorobromide emulsion (125 mg. gelatin/ft.² and 150 mg. silver/ft.²), 2,5-di-sec-dodecylhydroquinone (50 mg./ft.²) and nucleating agent formyl-4-methylphenylhydrazine (1 g./mole of silver);
9. interlayer of gelatin (100 mg./ft.²) and 2,5-di-sec-dodecylhydroquinone (50 mg./ft.²);
10. yellow image dye-providing compound (100 mg./ft.²) having the formula

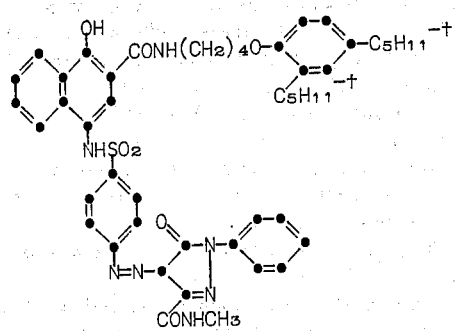

and gelatin (150 mg./ft.²);

11. blue-sensitive internal-image gelatin-silver chlorobromide emulsion (100 mg. gelatin/ft.² and 150 mg. silver/ft.²), 2,5-di-sec-dodecylhydroquinone (50 mg./ft.²) and nucleating agent formyl-4-methylphenylhydrazine (1 g./mole of silver); and
12. overcoat of gelatin (82.5 mg./ft.²).

The above silver halide emulsions are direct-positive emulsions having high internal sensitivity and low surface sensitivity of the type described in U.S. Pat. No. 2,592,250.

The above-prepared photosensitive element is then exposed to a graduated-density multicolor test object. The following processing composition is employed in a pod and is spread between the photosensitive element and an opaque cellulose acetate sheet by passing the transfer "sandwich" between a pair of juxtaposed pressure rollers:

| | |
|---|---|
| sodium hydroxide | 40 g. |
| 4-hydroxymethyl-4-methyl-1-phenyl-3-pyrazolidone | 4 g. |
| 5-methylbenzyltriazole | 0.1 g. |
| potassium iodide | 0.01 g. |
| hydroxyethyl cellulose | 25 g. |
| distilled water to | 1000 ml. |

After 4 minutes, the element is separated from the opaque sheet, subjected to a 1-minute acid rinse, fixed for 4 minutes, washed and dried. The following sensitometric results are obtained.

| Maximum Density | | | Minimum Density | | |
|---|---|---|---|---|---|
| Red | Green | Blue | Red | Green | Blue |
| 1.24 | 1.58 | 1.96 | 0.36 | 0.42 | 0.42 |

The cyan image dye-providing compound used in this example is prepared in accordance with Example 13 of U.S. application filed.

The yellow image dye-providing compound used in this example is prepared as follows:

To a solution of 7.3 g. (0.015 mole) of 1-hydroxy-4-amino-N-[Δ-(2,4-di-t-amylphenoxy)butyl]-2-naphthamide in 60 ml. of dry pyridine cooled to 2°C. in an ice bath and stirred in a nitrogen atmosphere are added 6.4 g. (0.016 mole) of 1-phenyl-3-methylcarbamyl-4-(p-chlorosulfonylphenylazo)-5-pyrazolone. The mixture is stirred for 2 hours at room temperature and poured into 1 liter of ice and water containing 75 ml. of hydrochloric acid. The precipitate is collected, dried and recrystallized to give 10.4 g. of the yellow image dye-providing compound.

The invention has been described in detail with particular reference to certain preferred embodiments thereof, but it will be understood that variations and modifications can be effected with the spirit and scope of the invention

We claim:

1. A nondiffusible sulfonamido compound which is alkali-cleavable upon oxidation to release a diffusible colorproviding moiety from a benzene nucleus thereof, said compound having a formula as follows:

I. 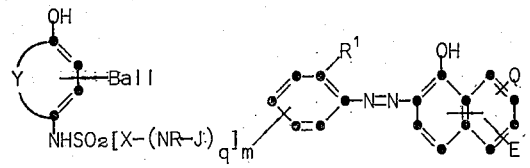

II. 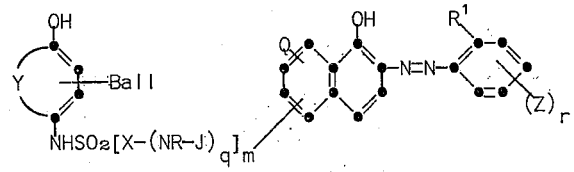

III. 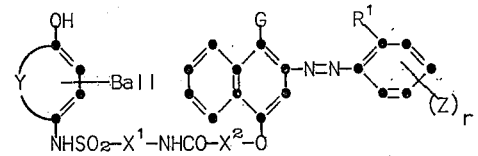

wherein Ball represents an organic ballasting group containing at least 8 carbon atoms which renders the compound nondiffusible in a photographic element during development in an alkaline processing composition;

Y represents the carbon atoms necessary to complete a benzene or naphthalene nucleus;

X represents $-R^2-L_n-R^2_p-$ where each $R^2$ can be the same or different and each represents alkylene having 1 to 8 carbon atoms; phenylene; or phenylene substituted with chloro, bromo, cyano, nitro, methoxy, methyl, carboxy, or sulfo; L represents oxy, carbonyl, carboxamido, carbamoyl, sulfonamido, sulfamoyl, sulfinyl or sulfonyl; n is an integer having a value of 0 or 1; p is 1 when n equals 1 and p is 1 or 0 when n equals 0, provided that when p is 1 the carbon content of the sum of both $R^2$ radicals does not exceed 14 carbon atoms;

R represents hydrogen, or alkyl having 1 to 6 carbon atoms;

J represents sulfonyl or carbonyl;

m and q each represent an integer having a value of 0 or 1;

$R^1$ represents hydrogen, chloro, bromo, fluoro, alkyl having 1 to 6 carbon atoms or alkoxy having 1 to 6 carbon atoms;

Q is the 5- or 8-position relative to the hydroxy radical and represents hydrogen, hydroxy, or $-NHCOR^3$ or $-NHSO_2R^3$ wherein $R^3$ is alkyl having 1 to 6 carbon atoms, alkyl having 1 to 4 carbon atoms substituted with hydroxy, cyano, sulfinyl, carboxy or sulfo; benzyl, phenyl or phenyl substituted with carboxy, chloro, methyl, methoxy, or sulfonyl;

G represents hydroxy, an alkali metal salt thereof, a photographically inactive amine salt thereof, or a hydrolyzable acyloxy group having the formula:

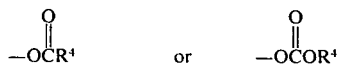

wherein $R^4$ is alkyl having 1 to 18 carbon atoms or phenyl;

E represents hydrogen, sulfo, $-SO_2NR^5R^6$ wherein $R^5$ represents hydrogen or alkyl having 1 to 6 carbon atoms and $R^6$ represents hydrogen, alkyl having 1 to 6 carbon atoms, alkyl having 1 to 4 carbon atoms substituted with hydroxy, cyano, sulfamoyl, carboxy or sulfo; benzyl; phenyl, or phenyl substituted with hydroxy, sulfonyl, sulfamoyl, carboxy, or sulfo; or E represents

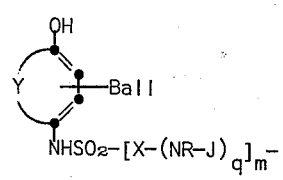

wherein each member is as described previously;

r is an integer having a value of 1 or 2;

Z represents chloro, bromo, or fluoro; carboxy, $-COOR^4$ wherein $R^4$ is as described previously, sulfo, a sulfamoyl radical as described for E, as well as hydrogen, alkoxy having 1 to 6 carbon atoms, alkyl having 1 to 6 carbon atoms, alkyl having 1 to 6 carbon atoms substituted with cyano, hydroxy, sulfamoyl, carboxy, or alkylsulfonamido having 1 to 4 carbon atoms; or $-CON(R^5)_2$ wherein each $R^5$ is the same or different and is as described previously;

$X^1$ represents alkylene, phenylene or substituted phenylene as described for $R^2$;

$X^2$ represents alkylene as described for $R^2$;

with the proviso that there be only one sulfo or carboxy radical present in said compound and that only one of $R^1$ and Z be hydrogen.

2. A compound as described in claim 1 wherein m has a value of 0, and r has a value of 1.

3. A compound as described in claim 1 wherein Y represents the atoms necessary to complete a naphthalene nucleus and r has a value of 1.

4. A compound as described in claim 1 wherein G is a hydroxy radical, and r has a value of 1.

5. A compound as described in claim 1 wherein $R^1$ represents alkoxy having 1 to 4 carbon atoms, and r has a value of 1.

6. A compound as described in claim 1 wherein
Y represents the atoms necessary to complete a naphthalene nucleus;

R² represents alkylene having 1 to 4 carbon atoms, phenylene or phenylene substituted with carboxy, chloro, methyl or methoxy;

L represents sulfamoyl, sulfonamido, carbamoyl or carboxamido;

R represents hydrogen;

$n$ is 0, $p$ is 0;

$q$ is an integer having a value of 1;

$m$ is an integer having a value of 0 or 1;

R¹ represents alkoxy having 1 to 4 carbon atoms;

Q represents hydrogen, hydroxy, -NHCOR³ or -NHSO₂R³ wherein R³ represents alkyl having 1 to 4 carbon atoms; alkyl having 1 to 4 carbon atoms substituted with hydroxy, cyano, sulfomoyl, carboxy, or sulfo; benzyl, phenyl or phenyl substituted with carboxy, chloro, methyl, methoxy or sulfamoyl;

E represents sulfo, —SO₂NHR⁶ wherein R⁶ is hydrogen, alkyl having 1 to 4 carbon atoms, or alkyl having 1 to 4 carbon atoms substituted with hydroxy, cyano, sulfamoyl, carboxy or sulfo; benzyl, phenyl or phenyl substituted with hydroxy, sulfonyl, sulfamoyl, carboxy or sulfo;

$r$ has a value of 1; and

Z represents hydrogen, alkyl having 1 to 4 carbon atoms; chloro; alkyl having 1 to 6 carbon atoms substituted with hydroxy, cyano, sulfamoyl, carboxy, sulfo, or alkylsulfonamido having 1 to 4 carbon atoms;

X¹ represents phenylene; and

X² represents alkylene having 1 to 4 carbon atoms.

7. A compound as described in claim 6 wherein m has a value of 0.

8. A compound as described in claim 6 wherein G is hydroxy.

9. A compound as described in claim 6 wherein X represents phenylene; J represents sulfonyl; X¹ represents phenylene; X² represents alkylene of 1 to about 4 carbon atoms; Q represents hydrogen, hydroxy, —NHSO₂CH₃, or —NHCOCH₃; and Z represents hydrogen, chloro, or —CH₂NHSO₂CH₃.

10. A compound as described in claim 6 wherein Ball represents

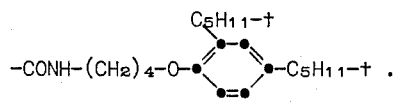

* * * * *